United States Patent
Yang et al.

(10) Patent No.: US 11,937,211 B2
(45) Date of Patent: Mar. 19, 2024

(54) SIDELINK COMMUNICATION RESOURCE SET CONFIGURATION AND MANAGEMENT

(71) Applicant: QUALCOMM Incorporated, San Diego, CA (US)

(72) Inventors: Wei Yang, San Diego, CA (US); Seyedkianoush Hosseini, San Diego, CA (US); Peter Gaal, San Diego, CA (US); Wanshi Chen, San Diego, CA (US); Hwan Joon Kwon, San Diego, CA (US); Krishna Kiran Mukkavilli, San Diego, CA (US); Seyed Ali Akbar Fakoorian, San Diego, CA (US); Yuchul Kim, San Diego, CA (US); Juan Montojo, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 17/241,984

(22) Filed: Apr. 27, 2021

(65) Prior Publication Data
US 2021/0345296 A1 Nov. 4, 2021

Related U.S. Application Data

(60) Provisional application No. 63/018,276, filed on Apr. 30, 2020.

(51) Int. Cl.
| | | |
|---|---|---|
| *H04W 72/00* | (2023.01) | |
| *H04W 8/00* | (2009.01) | |
| *H04W 72/02* | (2009.01) | |
| *H04W 72/0446* | (2023.01) | |
| *H04W 72/53* | (2023.01) | |

(52) U.S. Cl.
CPC .......... *H04W 72/02* (2013.01); *H04W 8/005* (2013.01); *H04W 72/0446* (2013.01); *H04W 72/53* (2023.01)

(58) Field of Classification Search
None
See application file for complete search history.

(56) References Cited

U.S. PATENT DOCUMENTS

| | | | |
|---|---|---|---|
| 2016/0278045 A1* | 9/2016 | Adachi | H04W 72/27 |
| 2018/0255535 A1* | 9/2018 | Takano | H04W 76/14 |
| 2020/0322100 A1* | 10/2020 | Cao | H04L 1/1893 |
| 2023/0014303 A1* | 1/2023 | Di Girolamo | H04W 72/20 |
| 2023/0039093 A1* | 2/2023 | Xiang | H04W 72/0453 |

* cited by examiner

*Primary Examiner* — Abdelillah Elmejjarmi
(74) *Attorney, Agent, or Firm* — Loza & Loza, LLP

(57) ABSTRACT

Various implementations and techniques are disclosed to enable and provide communication devices, methods, and systems for sidelink communication resources configuration and management. Wireless devices use a communication resource configuration and management procedure to determine resources for sidelink communication with potential power saving.

24 Claims, 19 Drawing Sheets

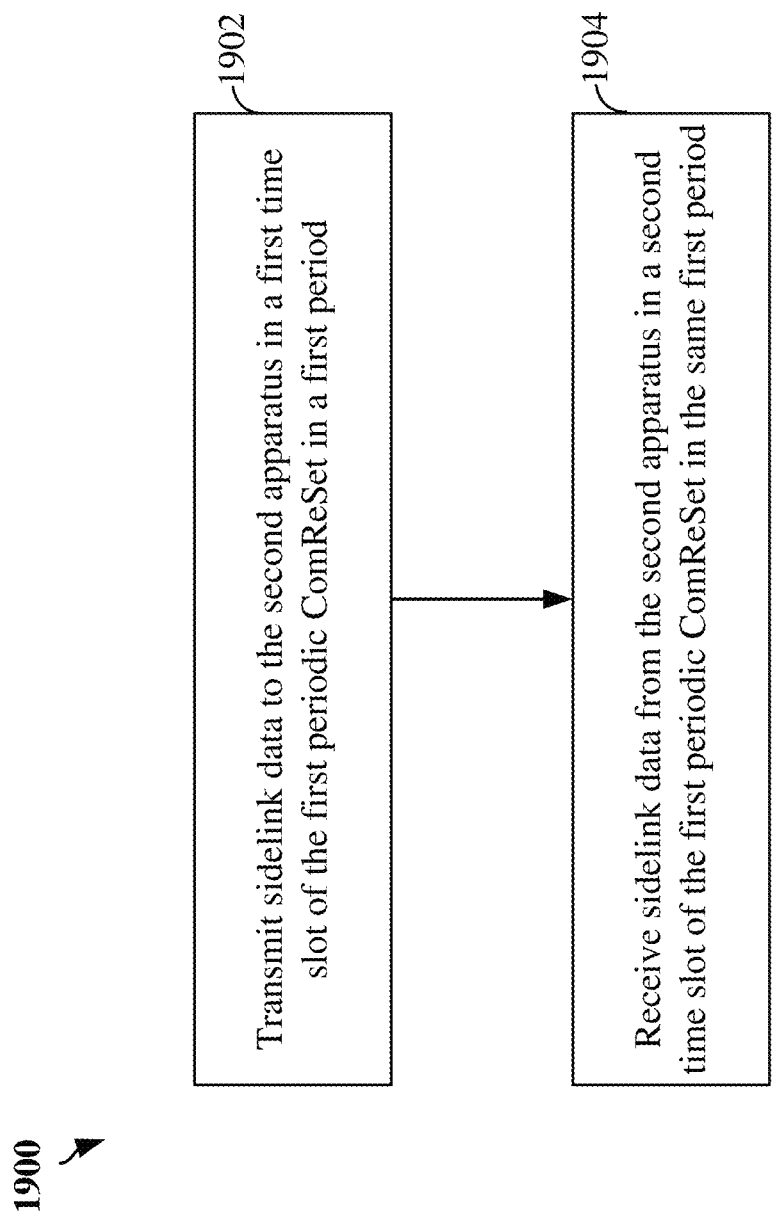

SIDELINK COMMUNICATION RESOURCE SET CONFIGURATION AND MANAGEMENT

PRIORITY CLAIM

This application claims priority to and the benefit of provisional patent application No. 63/018,276 filed in the United States Patent Office on Apr. 30, 2020, the entire content of which is incorporated herein by reference as if fully set forth below in its entirety and for all applicable purposes.

TECHNICAL FIELD

The technology discussed below relates generally to wireless communication systems, and more particularly, to sidelink communication resources configuration and management.

INTRODUCTION

Wireless communication devices, sometimes referred to as user equipment (UE), may communicate with a base station or may communicate directly with another UE. When a UE communicates directly with another UE, the communication is referred to as device-to-device (D2D) or sidelink communication. In sidelink communication, voice and data traffic from one UE may be transmitted to one or more other UEs without the communication signals passing through a base station of a telecommunication network.

In particular use cases, a UE may be a wireless communication device, such as a portable cellular device, or may be a vehicle, such as an automobile, a drone, or may be any other connected devices. Vehicle-based communications may include vehicle-to-everything (V2X), which may include vehicle-to-vehicle (V2V), vehicle-to-infrastructure (V2I), vehicle-to-network (V2N), and vehicle-to-pedestrian (V2P). Vehicle-to-everything communication and particularly, V2V communication may be used in various applications, for example, collision avoidance and autonomous driving. In a New Radio (NR) network, two resource allocation modes are available: mode 1 and mode 2. Mode 1 is a centralized mode, where a base station determines sidelink resource allocations. Mode 2 is a distributed mode, where a user equipment (UE) can autonomously determine resource allocations for sidelink communication.

SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various implementations and techniques are disclosed to enable and provide communication devices, methods, and systems for sidelink communication resources configuration and management.

One aspect of the disclosure provides a method of wireless communication at a first apparatus. The method includes selecting a first periodic communication resource set (ComReSet) from a resource pool divided in a time domain into a plurality of periodic communication resource sets (ComReSets) dedicated to sidelink communication. The method further includes establishing a sidelink connection with a second apparatus using the first periodic ComReSet selected from the plurality of periodic ComReSets. The method further includes communicating with the second apparatus using the first periodic ComReSet for sidelink communication.

Another aspect of the disclosure provides a first apparatus for wireless communication. The first apparatus includes a transceiver configured to communicate with a second apparatus, a memory, and a processor operatively coupled to the memory and the transceiver. The processor and the memory are configured to select a first periodic communication resource set (ComReSets) from a resource pool divided in a time domain into a plurality of periodic communication resource sets (ComReSets) dedicated to sidelink communication. The processor and the memory are further configured to establish a sidelink connection with a second apparatus using the first periodic ComReSet selected from the plurality of periodic ComReSets. The processor and the memory are further configured to communicate with the second apparatus using the first periodic ComReSet for sidelink communication.

Another aspect of the disclosure provides an article of manufacture for use by a first apparatus in a wireless communication network. The article includes a computer-readable medium having stored therein instructions executable by a processor of the first apparatus. The instructions cause the first apparatus to select a first periodic communication resource set (ComReSets) from a resource pool divided in a time domain into a plurality of periodic communication resource sets (ComReSets) dedicated to sidelink communication. The instructions further cause the first apparatus to establish a sidelink connection with a second apparatus using the first periodic ComReSet selected from the plurality of periodic ComReSets. The instructions cause the first apparatus to communicate with the second apparatus using the first periodic ComReSet for sidelink communication.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary implementations may be discussed below as device, system, or method examples, it should be understood that such exemplary embodiments can be implemented in various devices, systems, and methods.

BRIEF DESCRIPTION OF THE DRAWINGS

FIG. 19 is a flow chart illustrating an exemplary sidelink communication process using a ComReSet including multiple time slots according to aspects of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure are directed to sidelink communication resources configuration and management. An example of sidelink communication is vehicle-to-everything (V2X) communication. In some aspects of the disclosure, V2X devices use a communication resource configuration and management procedure to determine resources for sidelink communication with potential power saving.

Figure 1:
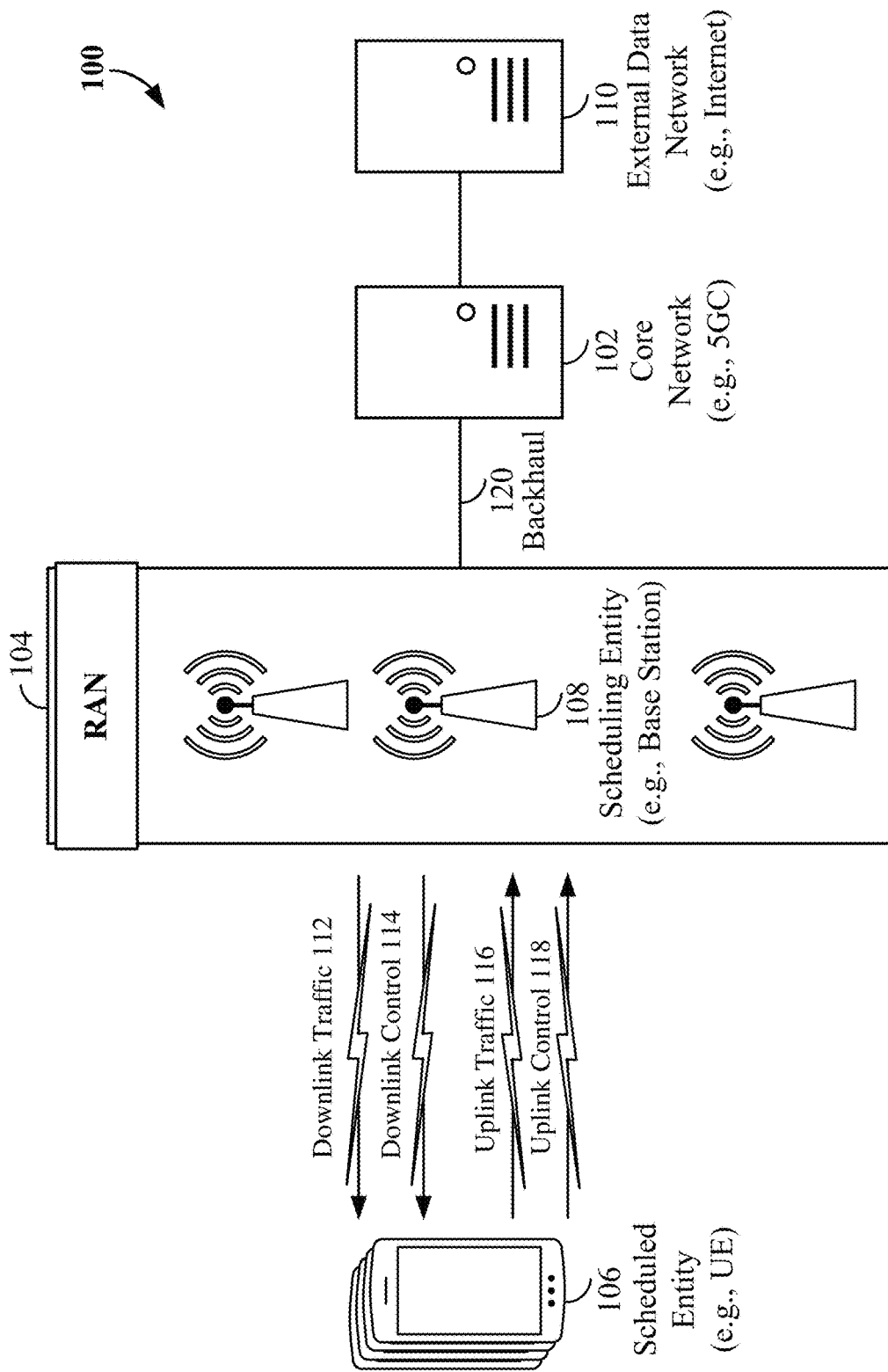
FIG. 1 is a schematic illustration of a wireless communication system according to some aspects of the disclosure.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, for health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
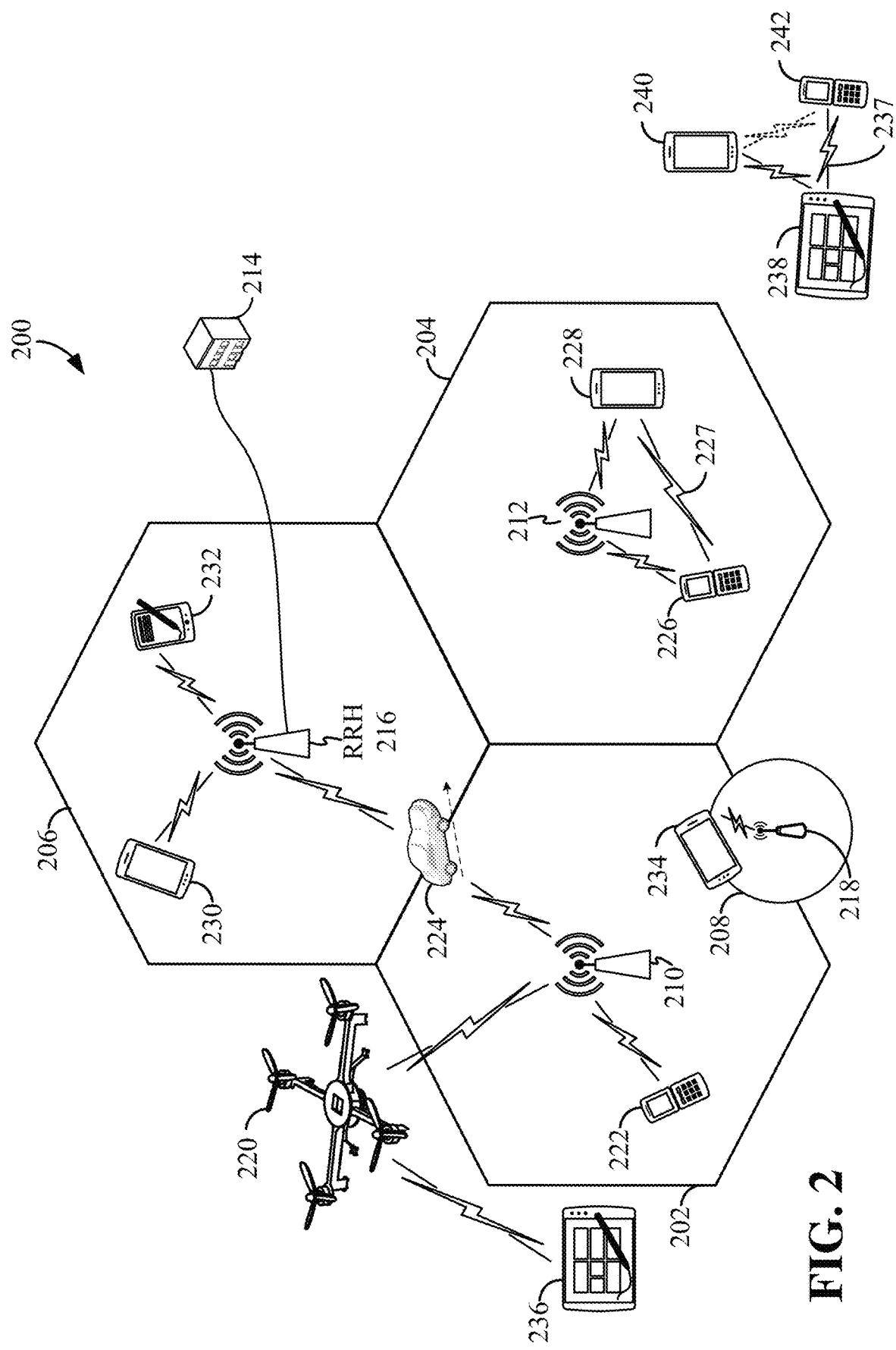
FIG. 2 is an illustration of an example of a radio access network according to some aspects of the disclosure.

FIG. 2 is a conceptual illustration of an example of a radio access network (RAN) 200 according to some aspects of the disclosure. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242) may communicate with each other using peer-to-peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In some examples, the base station 212 may allocate resources to the UEs 226 and 228 for the sidelink communication. In some examples, the UEs can autonomously determine resource allocations for sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure the strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
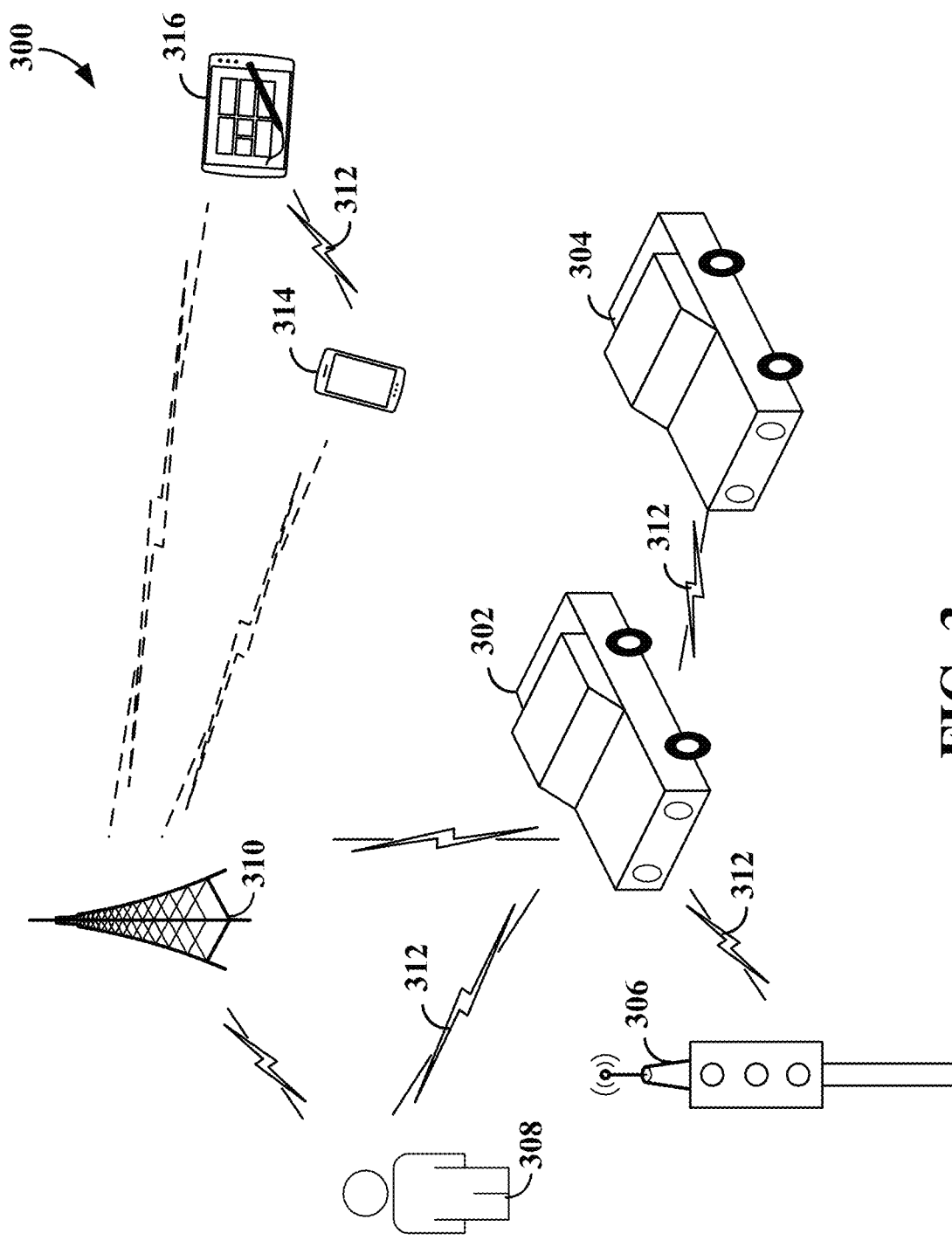
FIG. 3 is an illustration of an exemplary wireless network using device-to-device (D2D) and vehicle-to-everything (V2X) wireless communication according to some aspects of the disclosure.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standards.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
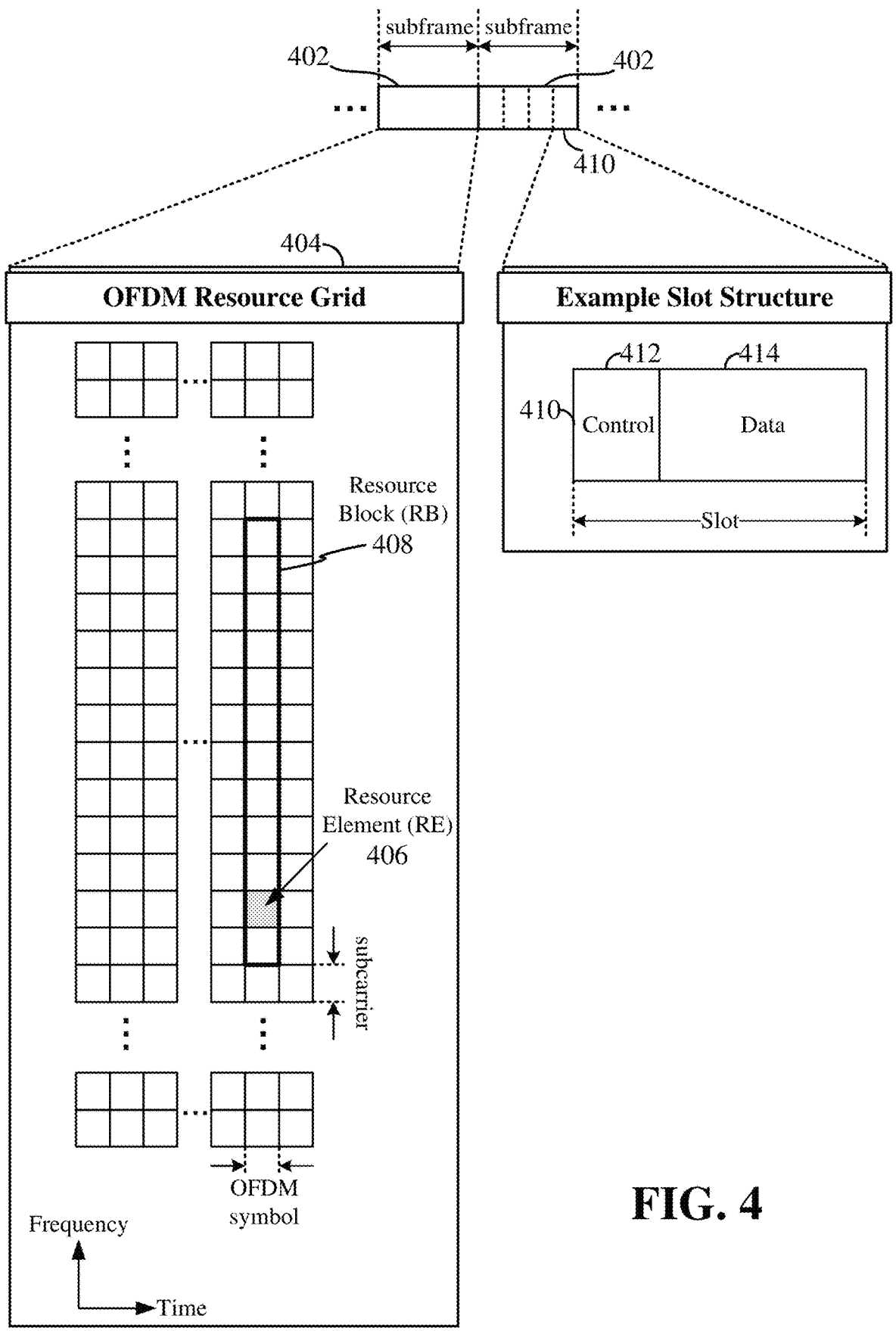
FIG. 4 is a schematic illustration of an organization of wireless resources in an air interface utilizing orthogonal frequency divisional multiplexing (OFDM) according to some aspects of the disclosure.

Referring now to FIG. 4, an expanded view of an exemplary subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In one example, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Sidelink Communication Resource Allocation

In some aspects, sidelink communication can use sidelink resources that are allocated by a scheduling entity (e.g., a base station or gNB) or selected by a sidelink device (e.g., a transmitting UE) without network (e.g., gNB) intervention. For example, a UE may select resources (time, frequency, and spatial resources) for sidelink communication from a resource pool (e.g., V2X resources) for sidelink communication. The resource pool (e.g., one or more RBs 408) may have been pre-allocated for sidelink or V2X communication. In other scenarios, the resource pool may be pre-existing, discovered, or leveraged by a UE (e.g., if other wireless devices are not using these resources for wireless communication). In some examples, a base station (e.g., gNB) may transmit sidelink resource allocation information to the UE using RRC signaling, and the UE selects the sidelink resources available among the allocated sidelink resources for sidelink communication. In this case, the base station does not select the resources actually used by the UE for sidelink communication. When the UE needs to perform sidelink communication, it searches for available communication resources that have been allocated for sidelink communication (e.g., V2X communication). Once the UE finds the available sidelink resources, the UE can transmit sidelink data (e.g., a sidelink data packet) using one or more slots. The control information of a sidelink transmission may reserve resources for a subsequent sidelink retransmission or new sidelink transmission.

Communication Resource Set Definition

In some aspects of the disclosure, a sidelink communication resource pool includes resource elements (REs) similar to the RE 406 described above in relation to FIG. 4. The resources of the sidelink communication resource pool can be partitioned into multiple periodic communication resource sets in the time domain. Each communication resource set (ComReSet) contains a set of subcarriers/subchannels and slot(s). A subchannel may include, for example, 10, 15, 20, 25, 50, 75, or 100 consecutive resource blocks. In the time domain, each ComReSet may contain one or more slots, and the ComReSet may occur periodically in time.

Figure 5:
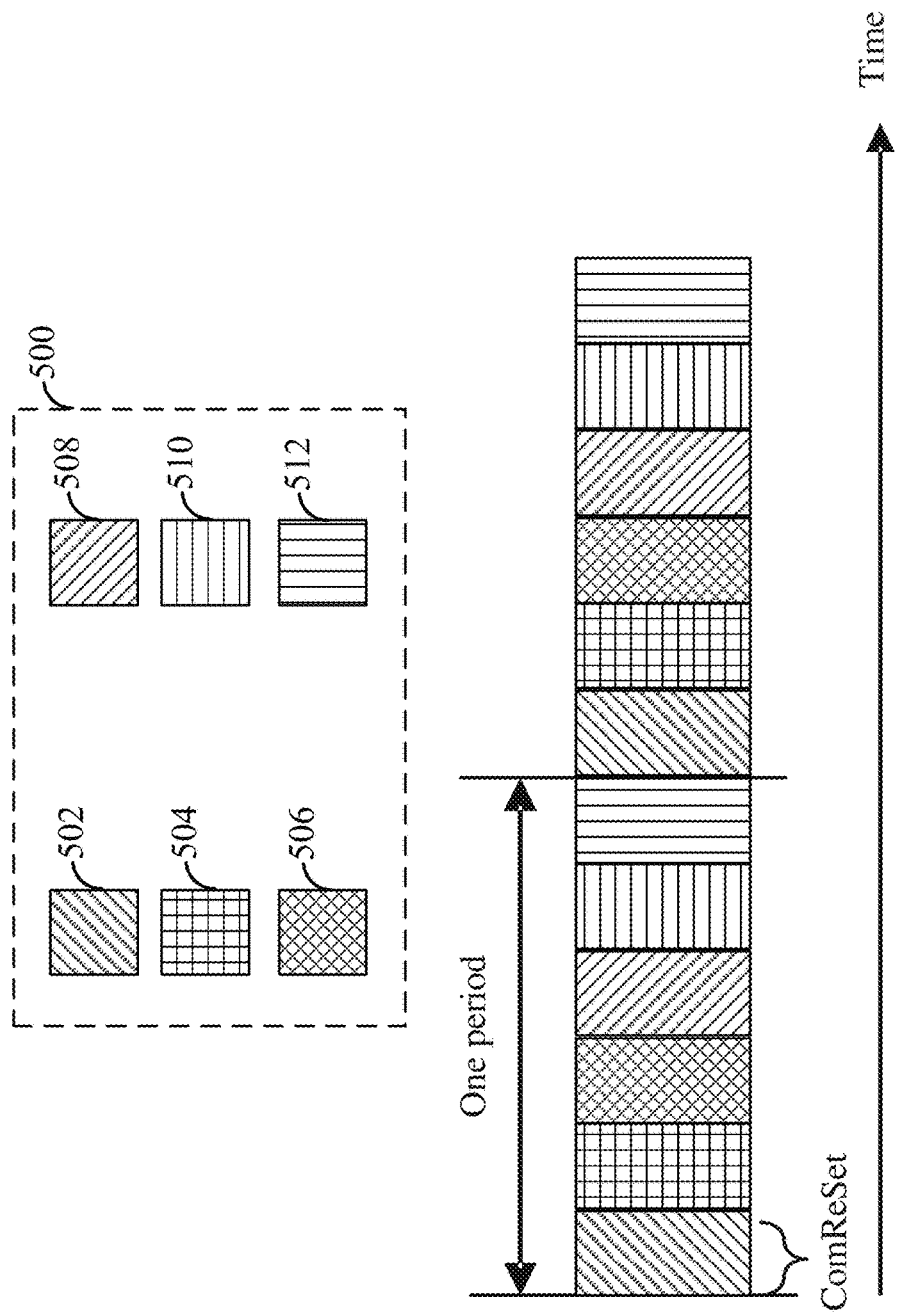
FIG. 5 is a schematic illustration of an exemplary resource pool and sidelink communication resource sets (ComReSets) according to some aspects of the disclosure.
Figure 6:
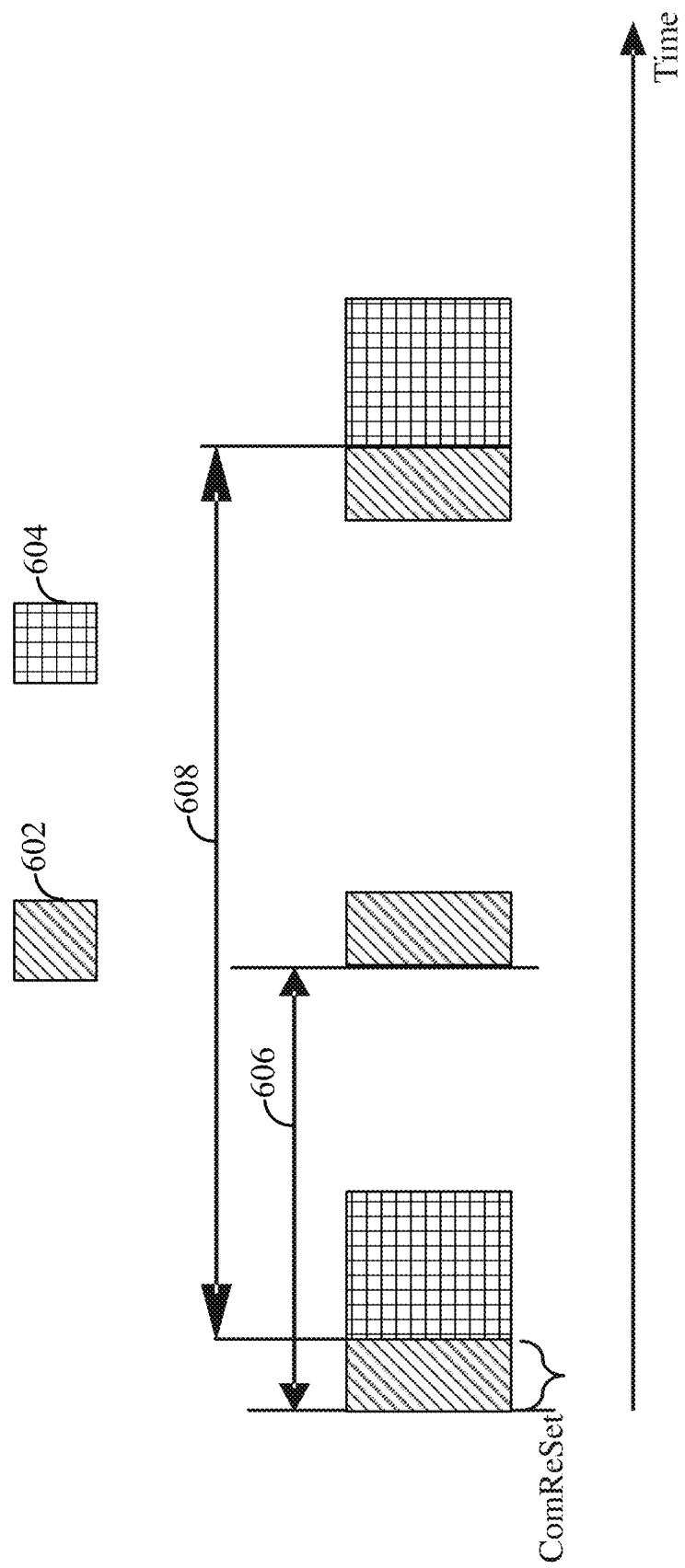
FIG. 6 is a schematic illustration of ComReSets having different periods according to some aspects of the disclosure.

FIG. 5 is a schematic illustration of an exemplary resource pool 500 for sidelink communication according to some aspects of the disclosure. In one example, the resource pool 500 may be partitioned into six periodic ComReSets 502, 504, 506, 508, 510, and 512. A UE can use one or more of the ComReSets for sidelink communication. Two periods of the ComReSets are shown in FIG. 5. In some aspects, different ComReSets in the same resource pool can have different time durations. For example, different ComReSets may contain different numbers of time slots. In some aspects, different ComReSets can have different periodicity. In FIG. 6, for example, a first ComReSet 602 has fewer numbers of time slots than a second ComReSet 604, and a period 606 of the first ComReSet 602 is different from a period 608 of the second ComReSet 604. That is, different ComReSets may repeat in the time domain with different frequencies. In some aspects, different ComReSets may contain different subchannels.

Figure 7:
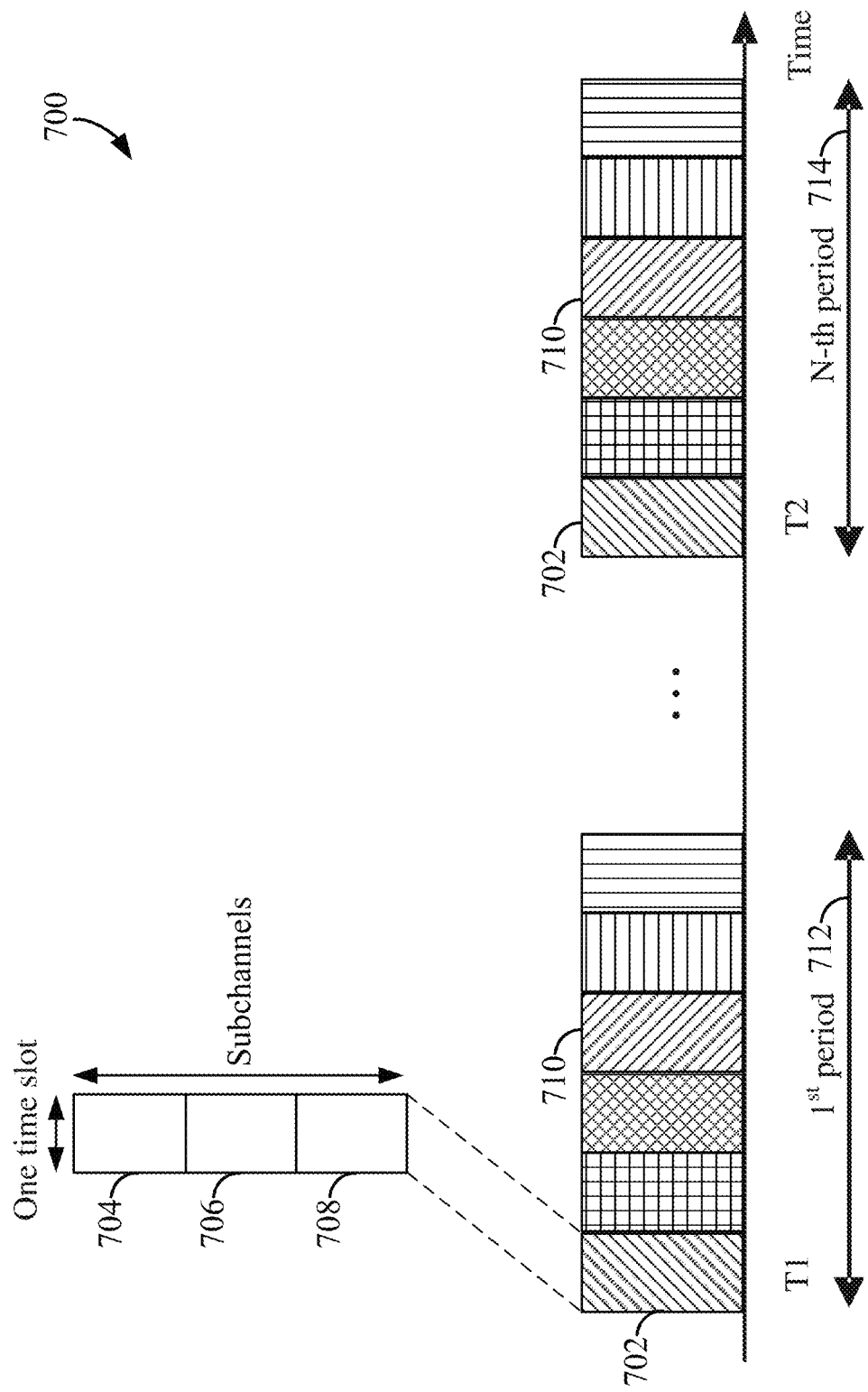
FIG. 7 is a schematic illustration of an exemplary periodic resource set (ComReSet) definition for sidelink communication according to some aspects of the disclosure.

FIG. 7 is a schematic illustration of an exemplary ComReSet definition 700 according to some aspects of the disclosure. In this example, a ComReSet 702 can contain resources (e.g., REs 406) that correspond to one time slot and a number of subchannels. Three exemplary subchannels (e.g., first subchannel 704, second subchannel 706, and third subchannel 708) are illustrated in FIG. 7 for the ComReSet 702. In one aspect, when a ComReSet contains one time slot, two sidelink UEs (e.g., V2X or D2D devices) can take turns using the same ComReSet to transmit signals.

Figure 8:
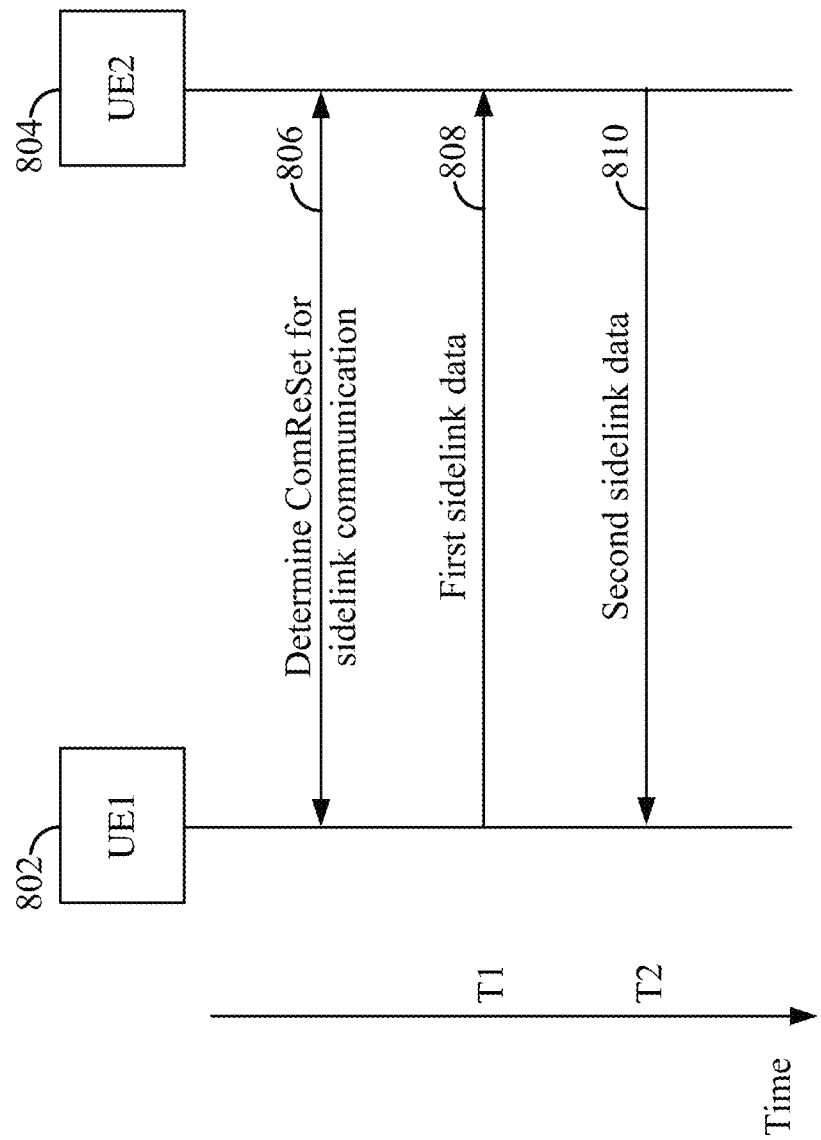
FIG. 8 is a schematic illustration of exemplary sidelink communication using the same periodic ComReSet according to some aspects of the disclosure.

FIG. 8 is a diagram illustrating an example of communication between UEs 802 and 804 using periodic ComReSets for sidelink or D2D communication according to some aspects. In some aspects, each of the UEs 802 and 804 may correspond to any of the UEs, D2D devices, V2X devices, or other scheduled entities shown in FIGS. 1-3. The ComReSets can be allocated using a distributed mode where the UEs (e.g., the transmitting UE) can autonomously determine the resource allocations for sidelink communication without involving a scheduling entity (e.g., a base station or gNB). For example, a first UE 802 and a second UE 804 can determine 806 and agree to use the periodic ComReSet 702 to communicate with each other using sidelink communication. Then, the first UE 802 can transmit first sidelink data 808 to the second UE using the ComReSet 702 at time T1. After the first UE 802 has finished the first sidelink transmission, the second UE 804 can transmit second sidelink data 810 to the first UE 802 at time T2 using the next ComReSet 702 that occurs periodically.

Figure 9:
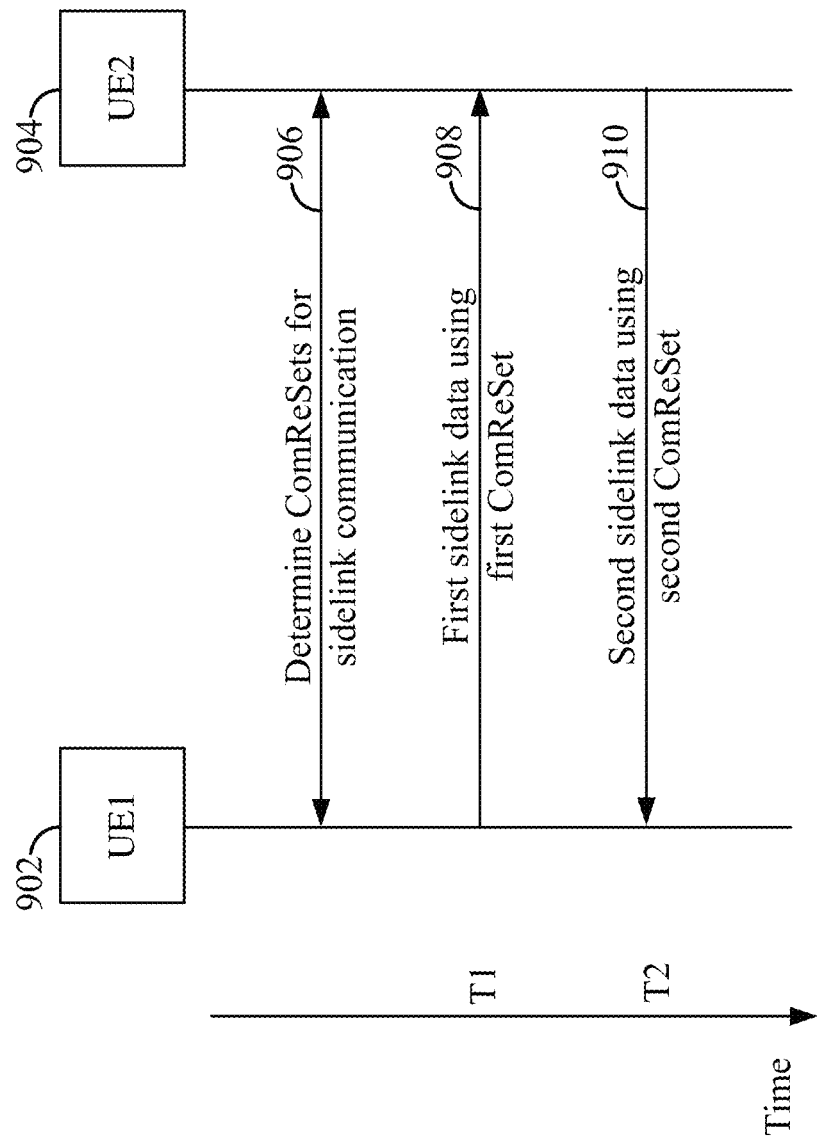
FIG. 9 is a schematic illustration of exemplary sidelink communication using different periodic ComReSets according to some aspects of the disclosure.

FIG. 9 is a diagram illustrating another example of communication between UEs 902 and 904 using periodic ComReSets for sidelink or D2D communication according to some aspects. In some aspects, each of the UEs 902 and 904 may correspond to any of the UEs, D2D devices, V2X devices, or other scheduled entities shown in FIGS. 1-3. A first UE 902 and a second UE 904 can determine 906 and agree to use different ComReSets to communicate sidelink data. For example, the first UE 902 can use a first ComReSet 702 and the second UE 904 can use a second ComReSet 710 for sidelink communication between the UEs. At time T1, the first UE 902 can use the first ComReSet 702 to transmit first sidelink data 908 to the second UE, and at time T2 the second UE 904 can use the second ComReSet 710 to transmit second sidelink data 910 to the first UE. In the examples described above in FIGS. 8 and 9, a transmitting UE can randomly select one or more subchannels to transmit sidelink data in a ComReSet, and a receiving UE can scan all the subchannels in the same ComReSet to detect and receive the sidelink communication. Each UE can use some or all subchannels in a ComReSet.

Figure 10:
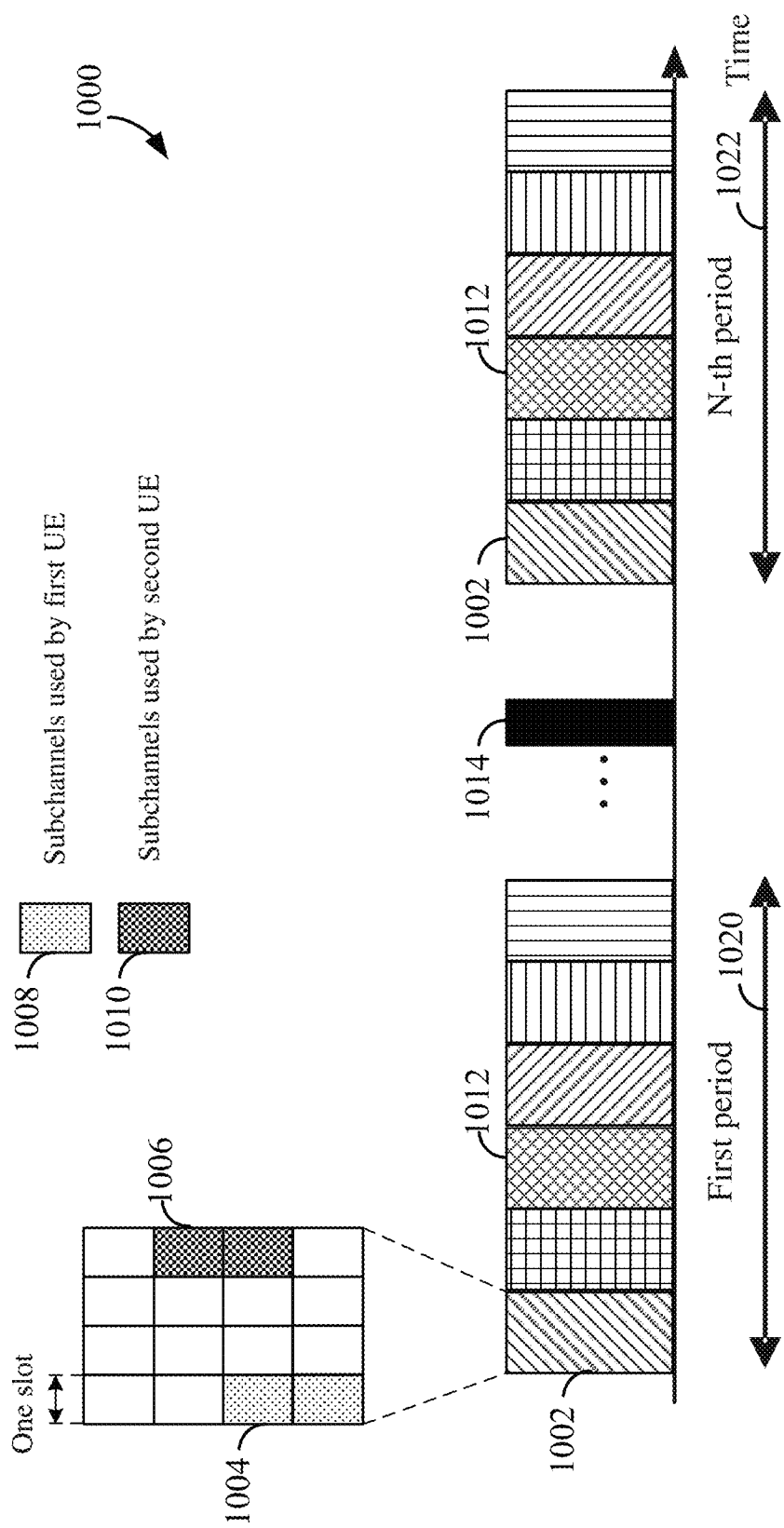
FIG. 10 is a schematic illustration of exemplary ComReSets and a separate set of resources for hybrid automatic repeat request (HARQ) feedback according to some aspects of the disclosure.

FIG. 10 is a schematic illustration of an exemplary ComReSet definition 1000 according to some aspects of the disclosure. In this example, an exemplary periodic ComReSet 1002 can contain more than one time slot (four time slots are shown in FIG. 10). For example, a first UE and a second UE can agree to use the ComReSet 1002 to communicate with each other using sidelink communication. The first UE can transmit sidelink data to the second UE using at least one slot (e.g., first slot 1004) of the ComReSet 1002, and the second UE can transmit sidelink data to the first UE using at least one slot (e.g., second slot 1006) of the same ComReSet 1002. Each UE can use some or all of the subchannels in a slot. For example, the first UE can use two subchannels 1008 in the first slot 1004, and the second UE can use two subchannels 1010 in the second slot 1006.

In one aspect of the disclosure, if two devices (e.g., first UE and second UE) use one ComReSet (e.g., ComReSet 702) for sidelink communication, a sidelink control channel (e.g., PSCCH) and a sidelink data channel (e.g., PSSCH) are contained in the same ComReSet. In some aspects, if two devices use two or more ComReSets for sidelink communication, a PSCCH transmission in a first ComReSet (e.g., ComReSet 702) can reserve the next transmission (e.g., PSSCH) in the same ComReSet (e.g., ComReSet 702) or in a different ComReSet (e.g., ComReSet 710).

In one aspect of the disclosure, the hybrid automatic repeat request (HARQ) feedback (ACK or NACK) for sidelink communication may happen within the same ComReSet (e.g., in a ComReSet 1002 containing multiple slots) or outside of the current ComReSet (e.g., a different ComReSet 1012 or same ComReSet in a different period). In one aspect, the UEs can use a separate set of resources for HARQ feedback. The separate set of resources (e.g., resources 1014) may be contained in the resource pool that is associated with the ComReSet. In one example, UEs can use a ComReSet for transmitting and receiving sidelink data, and the UEs can determine a separate set of resources for HARQ feedback, which may have the same periodicity as the ComReSet used for sidelink data. The separate set of resources are associated with the ComReSet, and can be determined from the ComReSet based on a predetermined mapping rule.

Resource Pool Configuration

In some aspects of the disclosure, the partition of a communication resource pool into ComReSets can be configured according to a resource pool configuration. In one example, the resource pool configuration includes a plurality of parameters. Some exemplary parameters are: a periodicity of a ComReSet, a number of ComReSets in the resource pool, and a size (e.g., number of slots) of each ComReSet. In some examples, the periodicity of a ComReSet may be configured in units of slots or milliseconds.

In one aspect, a resource pool configuration can indicate the periodicity of ComReSets and the number of ComReSets. Then, the UEs can determine the size of each ComReSet from the configured number of slots directly. In one example, a resource pool configuration can indicate the periodicity of ComReSets and slots per ComReSets. In this case, the UEs can implicitly determine the size of each ComReSet from the periodicity and number of ComReSets. In this resource pool configuration, all ComReSets are configured of the same size (i.e., number of slots).

Figure 11:
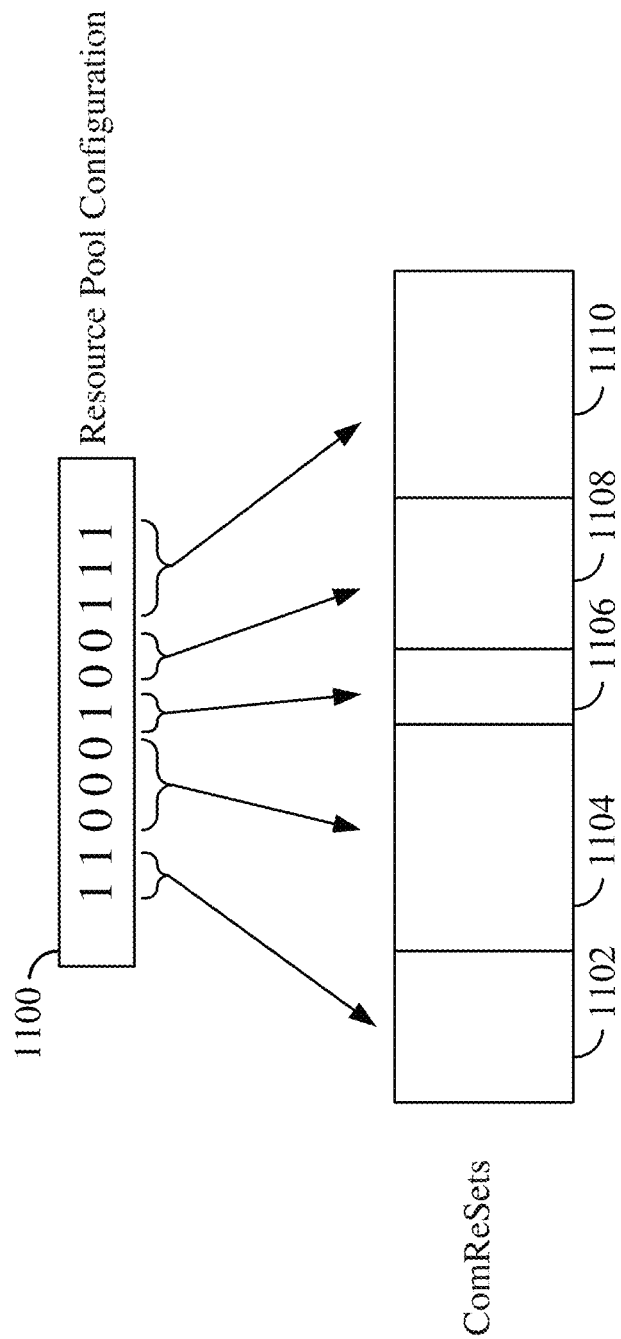
FIG. 11 is a schematic illustration of a resource pool configuration implemented as a bitmap according to some aspects of the disclosure.

FIG. 11 is a diagram illustrating a resource pool configuration implemented as a bitmap 1100 according to some aspects. Each bit of the bitmap 1100 can correspond to one time slot. Consecutive 1s or 0s of the bitmap indicate the slot(s) belonging to one ComReSet. The ComReSets can repeat based on the bitmap definition. In one example, the bitmap may be 11000100111. Starting from the most significant bit (MSB) of the bitmap, the bitmap defines a first ComReSet 1102 including 2 slots (bits 11), a second ComReSet 1104 including 3 slots (bits 000), a third ComReSet 1106 including 1 slot (bit 1), a fourth ComReSet 1108 including 2 slots (bits 00), and a fifth ComReSet 1110 including 3 slots (bits 111). The ComReSets defined by the bitmap 1100 can repeat in time. In the above example, the bitmap has eleven bits that indicate that the periodicity of each ComReSet is eleven slots. Therefore, the first ComReSet 1102 will repeat in every eleven slots, and so do the rest of ComReSets. In other examples, each bit in the bitmap 1100 may correspond to multiple slots, e.g., 2 or more slots. In one aspect, the number of slots represented by one bit can be explicitly configured through the resource pool configuration. In one aspect, the number of slots represented by one bit can be implicitly determined based on the periodicity of the ComReSets and the resource pool. For example, if the periodicity of the ComReSets is configured to be 44 slots, and the bitmap has eleven bits, it can be determined that each bit of the bitmap corresponds to four slots. Therefore, in this example, the first ComReSet 1102 can span 8 slots (4 slots×2) because the first ComReSet 1102 is represented by two bits "11" in the bitmap 1100.

In one aspect, a scheduling entity (e.g., base station or gNB) may signal the resource pool configuration to the UEs in a cell controlled by the scheduling entity. In another aspect, the resource pool configuration may be predetermined according to a communication standard (e.g., 5G NR) governing the sidelink communication. In this case, the resource pool configuration can be predetermined or known.

Exemplary Sidelink Communication Using ComReSets

Figure 12:
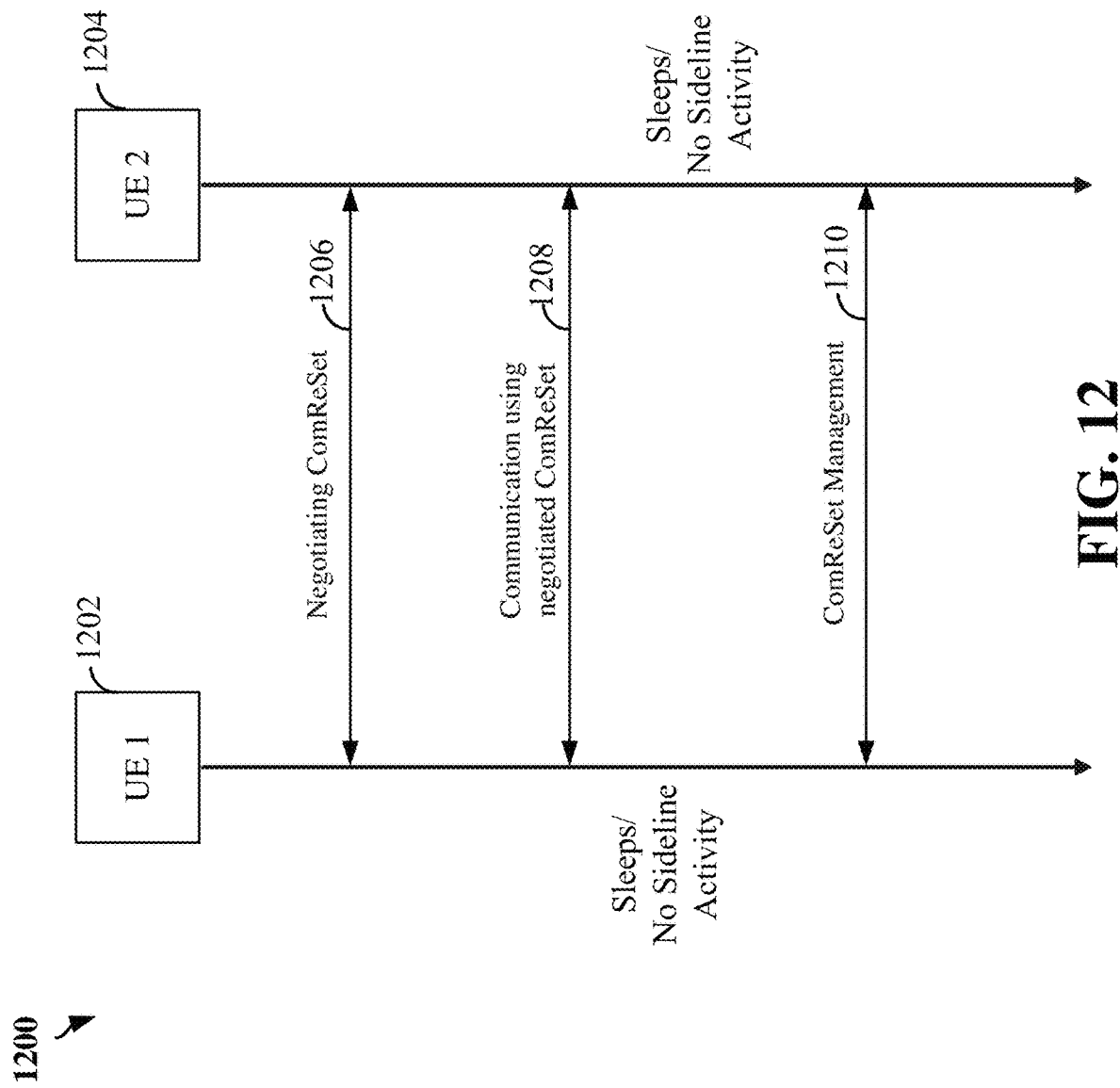
FIG. 12 is a diagram illustrating exemplary sidelink communication between two sidelink devices according to some aspects of the disclosure.

FIG. 12 is a diagram illustrating exemplary sidelink communication between two UEs 1202 and 1204 according to some aspects of the disclosure. In some aspects, each of the UEs 1202 and 1204 may correspond to any of the UEs, D2D devices, V2X devices, or other scheduled entities shown in FIGS. 1-3. A first UE 1202 and a second UE 1204 can negotiate with each other to determine one or more ComReSets for sidelink communication. In one example, the UEs may be any of the UEs illustrated in FIGS. 1-3, 8, and 9. Before the UEs can communicate with each other using a sidelink connection, the first UE 1202 and second UE 1204 can negotiate (e.g., negotiating ComReSet 1206) with each other to determine the sidelink resources (e.g., ComReSets) that can be used. In one example, the sidelink resources may be the sidelink resource pool 500 and resources described above in relation to FIGS. 5-7.

In one aspect, the UEs 1202 and 1204 can perform the negotiation in a separate resource pool that is not part of the resource pool reserved for sidelink communication. For example, the UEs can use a discovery resource pool to determine one or more ComReSets for sidelink communication. In one example, the discovery resource pool may include time-frequency resources (e.g., one or more REs 406 or RBs 408) dedicated by a base station for discovering and negotiating sidelink resources. In another example, the discovery resource pool may include predetermined time-frequency resources according to a communication standard (e.g., 5G NR) governing the sidelink communication.

In another aspect, the UEs 1202 and 1204 can perform the ComReSet negotiation in a special ComReSet among the ComReSets of a sidelink resource pool. The special ComReSet may be designated for negotiation purposes. For example, one of the ComReSets shown in FIG. 5 may be a dedicated ComReSet (ComReSet 602 or 702) for negotiating sidelink resources between the UEs.

In another aspect, the first UE 1202 can select the ComReSet on its own and communicate the selected ComReSet to the second UE 1204 using higher layer signaling, for example, using radio resource control (RRC) signaling or medium access control (MAC) control element (CE).

Once the first UE 1202 and second UE 1204 agree on the ComReSet(s), the UEs can communicate (e.g., communication using negotiated ComReSet 1208) with each other using sidelink communication via one or more negotiated ComReSets. Because the negotiated ComReSets may occupy only a subset of time slots within the sidelink resource pool, one or both UEs may sleep or stop sidelink activities (i.e., do not transmit, receive, or sense the sidelink channel) during the time slots that are not included in the selected ComReSets. The UEs (e.g., non-vehicular UEs) can reduce power consumption while sleeping or not performing sidelink activities. At some point, the UEs can perform ComReSet management 1210 to add and/or release ComReSets in order to adapt to changing sidelink traffic patterns and/or channel conditions.

Figure 13:
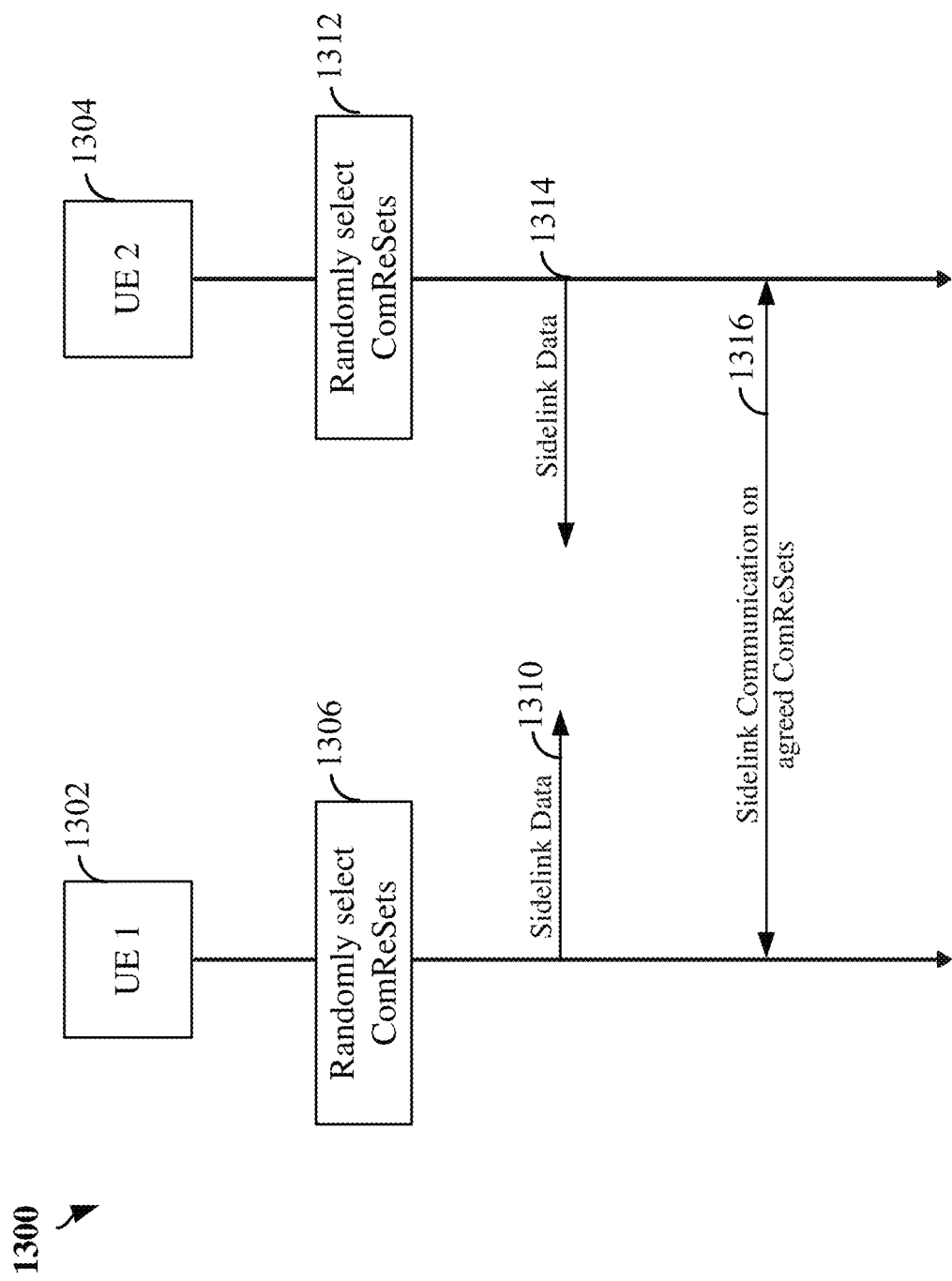
FIG. 13 is a diagram illustrating an exemplary process for selecting a ComReSet according to some aspects of the disclosure.

FIG. 13 is a diagram illustrating an exemplary process 1300 for selecting a ComReSet between two UEs 1302 and 1304 according to some aspects of the disclosure. In some aspects, each of the UEs 1302 and 1304 may correspond to any of the UEs, D2D devices, V2X devices, or other scheduled entities shown in FIGS. 1-3. In the example shown in FIG. 13, UEs 1302 and 1304 can randomly scan the available ComReSets until the two UEs agree on a common ComReSet for sidelink communication between the UEs. At block 1306, a first UE 1302 can randomly select a ComReSet. Then, at 1310, the first UE 1302 can transmit predetermined data in the randomly selected ComReSet. Similarly, at 1312, a second UE 1304 can randomly select a ComReSet. Then, at 1314, the second UE 1304 can transmit predetermined data in the randomly selected ComReSet. A receiving UE can identify the transmitting UE based on the received data. Each UE also randomly selects a ComReSet to monitor transmission from the other UE. When a transmitting UE and a receiving UE select the same ComReSet, at 1316, they can communicate and agree on using that ComReSet for sidelink communication.

Figure 14:
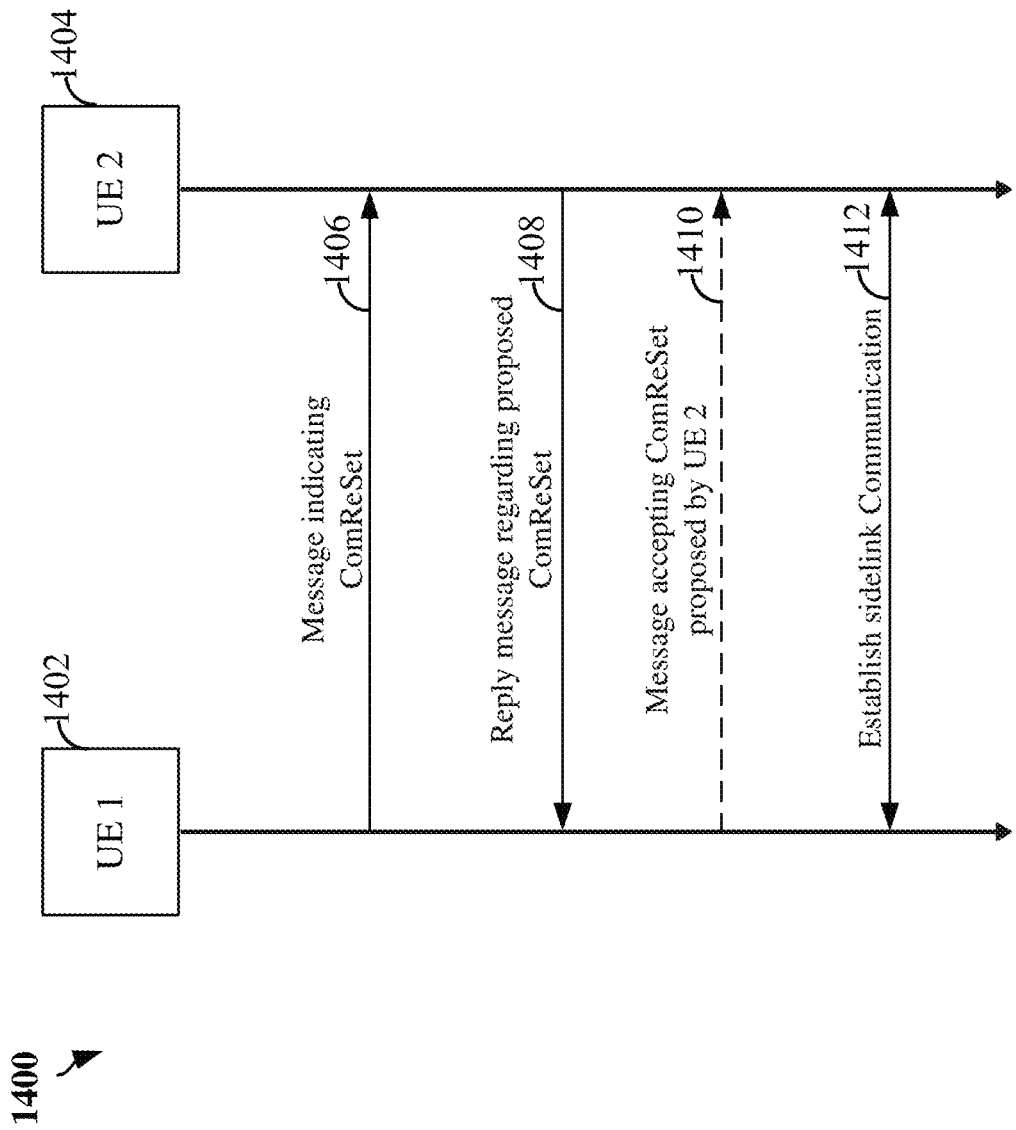
FIG. 14 is a diagram illustrating an exemplary ComReSet negotiation process according to some aspects of the disclosure.

FIG. 14 is a diagram illustrating an exemplary ComReSet negotiation process 1400 between two UEs 1402 and 1404 according to one aspect of the disclosure. In some aspects, each of the UEs 1402 and 1404 may correspond to any of the UEs, D2D devices, V2X devices, or other scheduled entities shown in FIGS. 1-3. During the negotiation, a first UE 1402 can transmit a message 1406 indicating one or more ComReSets that the first UE desires to use for sidelink communication. For example, the ComReSet(s) (e.g., ComReSet 502 or 702) may be selected from a resource pool (e.g., resource pool 500). If a second UE 1404 receives the message from the first UE 1402, the second UE 1404 can transmit a reply message 1408 indicating whether or not the second UE 1404 agrees to establish sidelink communication using the ComReSet(s) selected by the first UE 1402. In some aspects, the second UE 1404 can propose a different ComReSet in the reply message. In that case, if the first UE agrees to the proposed ComReSet selected by the second UE alone, the first UE 1402 can transmit an acceptance message 1410 (e.g., notification) to the second UE 1404. After the UEs agree on the ComReSet(s), the UEs can establish sidelink communication 1412 using the agreed upon ComReSet(s).

Communication Resource Set Management

Figure 15:
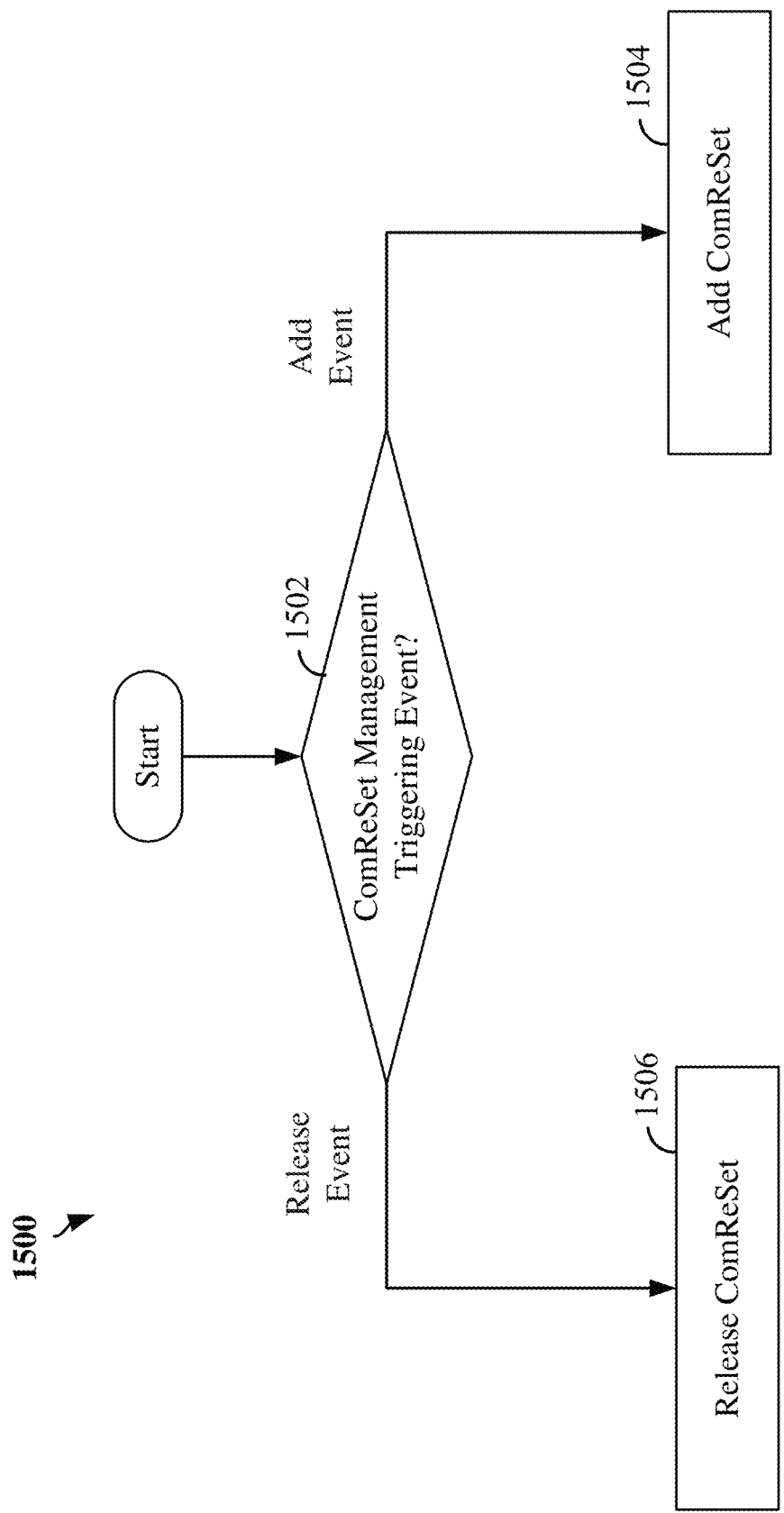
FIG. 15 is a flow chart illustrating an exemplary ComReSet management process according to some aspects of the disclosure.

FIG. 15 is a flow chart illustrating an exemplary ComReSet management process 1500 according to some aspects of the disclosure. In one example, two sidelink devices (e.g., the UEs in FIGS. 8, 9, 12, and 13) may use the ComReSet management process 1500 to add and/or release a ComReSet to/from an existing sidelink connection according to the sidelink traffic pattern, needs of the UEs, and/or channel conditions.

At decision block 1502, a UE (e.g., UE 802 or 804) can determine whether a ComReSet management triggering event has occurred. For example, the ComReSet management triggering event may be a first triggering event to add a ComReSet to a sidelink connection or a second triggering event to release a ComReSet from a sidelink connection.

At block 1504, if the triggering event is an event to add a ComReSet, the UEs can add one or more ComReSets to the existing sidelink connection. In some examples, the UEs can add a ComReSet using the negotiation methods described above in relation to FIGS. 12-14. In one example, the triggering event for adding a ComReSet may occur when data arrives at a sidelink data buffer of either UE, and the UE determines that the data cannot be handled by the current ComReSet(s) in use. For example, the current ComReSet may not provide enough bandwidth or transfer rate to handle the sidelink data arriving at the sidelink data buffer. In another example, the triggering event for adding a ComReSet may occur when the interference level and/or congestion on the sidelink connection using the current ComReSet(s) is greater than a certain threshold. Because the UEs have already established a sidelink connection, the UEs can negotiate the addition of a ComReSet using the ComReSet(s) of the existing sidelink connection. That is, the negotiation does not need to happen in a separate resource pool or dedicated ComReSet for negotiation, etc.

In one example, a triggering event to add ComReSet may occur at one or both UEs (e.g., UEs 802 and 804). The first UE (e.g., UE 802) may then select a ComReSet on its own (alone), and indicate the selected ComReSet to the second UE (e.g., UE 804). In some aspects, the first UE may first send a request to the second UE to add a ComReSet (e.g., if the triggering event only occurs at the first UE). Then, the second UE may send a reply to the request (e.g., accepting or rejecting the suggested ComReSet by the first UE). After the first UE sends the request, and before the first UE makes a determination, the second UE may also transmit some measurement information to assist the first UE to select the ComReSet. For example, the second UE may provide the channel and/or interference quality of some candidate ComReSets that may or may not include a ComReSet suggested/proposed by the first UE, and the first UE may select a ComReSet based on the received channel and/or interference quality.

At block 1506, if the triggering event is an event to release a ComReSet, the UEs can release a ComReSet from the existing sidelink connection. In one example, the triggering event for releasing a ComReSet may occur when no sidelink activity occurs between the UEs for a predetermined time duration. The UEs may maintain a timer for tracking the inactivity time duration. For example, the UEs can start the timer after establishing the sidelink connection, and reset the timer whenever sidelink traffic occurs. When the timer expires without being reset due to a lack of sidelink activity, the expiry of the timer can trigger the ComReSet release event. In another example, the triggering event for releasing a ComReSet may occur when the UEs purposely end or terminate their sidelink connection because it is no longer needed. In another example, the triggering event for releasing a ComReSet may occur when the congestion and/or interference level of the current sidelink connection is above a certain threshold. In this case, the UEs can renegotiate a new ComReSet and then release the current one. For example, the first UE may send a request to release a ComReSet (e.g., when the triggering event only occurs at the first UE, but not at the second UE). Then, the second UE may respond to (e.g., confirm or reject) the request of releasing the ComReSet.

In some aspects of the disclosure, the UEs can merge two ComReSets. In one example, the UEs can merge two ComReSets that have the same periodicity. In another example, the UEs can merge two ComReSets that are used to transmit the same data traffic. After merging, the UEs treat the two merged ComReSets as one extended ComReSet in terms of resource allocation/reservation, sensing, measurement and signaling. Merging two ComReSets into one can reduce the signaling, sensing, and/or measurement overhead of using the ComReSets separately. For example, instead of communicating measurement information for each ComReSet separately, the UEs can communicate the measurement information for one merged ComReSet to reduce measurement overhead.

In one example, if a first ComReSet has 2 slots, and a second ComReSet has 5 slots in each period, then the UEs may negotiate to merge the two ComReSets into one ComReSet with a length equal to 7 slots. In one example, the merging operation may be performed among consecutive ComReSets (i.e., adjacent in time) or non-consecutive ComReSets. In some examples, one UE may request the merging operation, and the other UE can accept the merging request.

Figure 16:
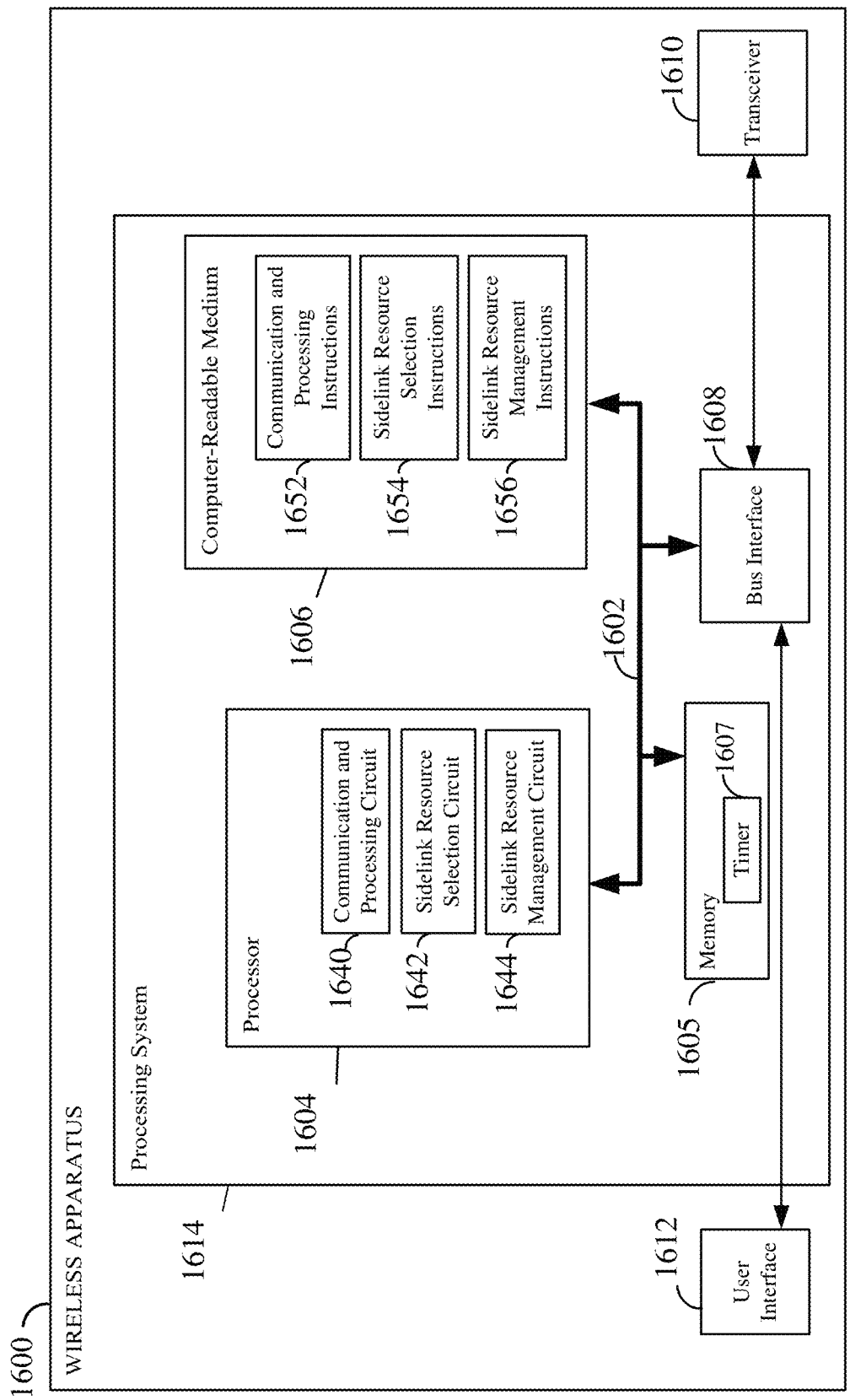
FIG. 16 is a block diagram illustrating an example of a hardware implementation for a wireless apparatus according to some aspects of the disclosure.

FIG. 16 is a block diagram illustrating an example of a hardware implementation for a wireless apparatus 1600 employing a processing system 1614. For example, the wireless apparatus 1600 may be a user equipment (UE), scheduled entity, or V2X device as illustrated in any one or more of FIGS. 1, 2, and/or 3. In another example, the apparatus 1600 may be a device capable of sidelink communication with another device.

The scheduling entity 1600 may be implemented with a processing system 1614 that includes one or more processors 1604. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1600 may be configured to perform any one or more of the functions described herein. That is, the processor 1604, as utilized in a wireless apparatus 1600, may be used to implement any one or more of the processes and procedures described below and illustrated in FIGS. 5-15, and 19.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 communicatively couples together various circuits including one or more processors (represented generally by the processor 1604), a memory 1605, and computer-readable media (represented generally by the computer-readable medium 1606). The bus 1602 may also link various other circuits such as timing sources, peripherals, voltage regulators, and power management circuits, which are well known in the art, and therefore, will not be described any further. In one example, the apparatus can implement a timer 1607, for example, in the memory 1605 for tracking and measuring time for various applications. A bus interface 1608 provides an interface between the bus 1602 and a transceiver 1610. The transceiver 1610 provides a communication interface or means for communicating with various other apparatus over a transmission medium. Depending upon the nature of the apparatus, a user interface 1612 (e.g., keypad, display, speaker, microphone, joystick, touchscreen) may also be provided. Of course, such a user interface 1612 is optional, and may be omitted in some examples, such as a base station.

The processor 1604 is responsible for managing the bus 1602 and general processing, including the execution of software stored on the computer-readable medium 1606. The software, when executed by the processor 1604, causes the processing system 1614 to perform the various functions described below for any particular apparatus. The computer-readable medium 1606 and the memory 1605 may also be used for storing data that is manipulated by the processor 1604 when executing software.

One or more processors 1604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1606. The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1604 may include circuitry configured for various functions, including, for example, one or more of the sidelink communication functions described in relation to FIGS. 5-15 and 17-19.

In some aspects of the disclosure, the processor 1604 may include a communication and processing circuitry 1640 configured for various functions, including for example communicating with a network core (e.g., a 5G core network), scheduled entities (e.g., UE), or any other entity, such as, for example, local infrastructure or an entity communicating with the scheduling entity 1600 via the Internet, such as a network provider. In some examples, the communication and processing circuit 1640 may be configured to process and transmit sidelink data via the transceiver 1610. For example, the communication and processing circuit 1640 may be configured to transmit sidelink data (e.g., V2X data packet) using one or more periodic ComReSets described above in relation to FIGS. 5-15. In addition, the communication and processing circuit 1640 may be configured to receive and process sidelink data received via the transceiver 1610. In one example, the communication and processing circuit 1640 may be configured to receive sidelink data from another UE or V2X device. The communication and processing circuit 1640 may further be configured to transmit and receive sidelink control information and data traffic. In addition, the communication and processing circuitry 1640 may be configured to receive and process uplink traffic and uplink control messages (e.g., similar to uplink traffic 116 and uplink control 118 of FIG. 1), transmit and process downlink traffic and downlink control messages (e.g., similar to downlink traffic 112 and downlink control 114).

In some examples, the communication and processing circuit 1640 may include one or more hardware components that provide the physical structure that performs processes related to wireless communication (e.g., signal reception and/or signal transmission) and signal processing (e.g., processing a received signal and/or processing a signal for transmission). The communication and processing circuit 1640 may further be configured to execute communication and processing software 1652 stored on the computer-readable medium 1606 to implement one or more functions described herein.

In some aspects of the disclosure, the processor 1604 may include a sidelink resource selection circuit 1642 that may be configured for various functions, including for example selecting sidelink communication resources (e.g., one or more ComReSets) from a resource pool that contains periodic ComReSets. The sidelink resource selection circuit 1642 may further be configured to negotiate with another sidelink device (e.g., UE) to select sidelink communication resources. In some examples, the sidelink resource selection circuit 1642 may include one or more hardware components that provide the physical structure that performs processes related to sidelink resource selection described herein. The sidelink resource selection circuit 1642 may further be configured to execute sidelink resource selection software 1654 stored in the computer-readable medium 1606 to implement one or more of the functions described herein.

In some aspects of the disclosure, the processor 1604 may include a sidelink resource management circuit 1644 that may be configured for various functions, including for example managing sidelink communication resources (e.g., ComReSets). The sidelink resource management circuit 1644 may be configured to add and/or release a ComReSet to/from an existing sidelink connection according to the sidelink traffic pattern, needs of the UEs, and/or channel condition. In some examples, the sidelink resource management circuit 1644 may include one or more hardware components that provide the physical structure that performs processes related to sidelink resource management described herein. The sidelink resource management circuit 1644 may further be configured to execute sidelink resource management software 1656 stored in the computer-readable medium 1606 to implement one or more of the functions described herein.

Figure 17:
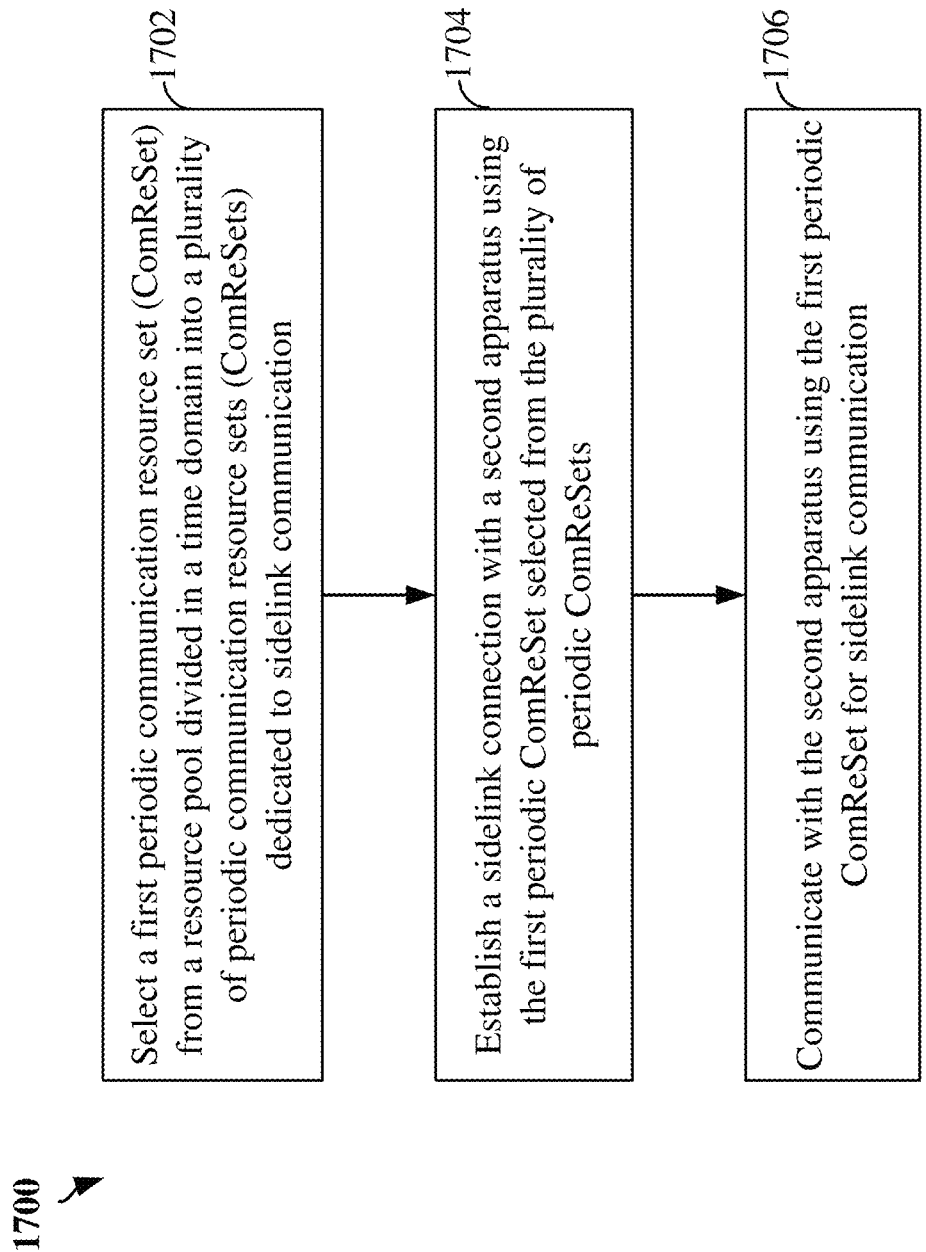
FIG. 17 is a flow chart illustrating an exemplary sidelink communication process in accordance with some aspects of the present disclosure.

FIG. 17 is a flow chart illustrating an exemplary sidelink communication process 1700 in accordance with some aspects of the present disclosure. As described below, some or all illustrated features may be omitted in a particular implementation within the scope of the present disclosure, and some illustrated features may not be required for the implementation of all embodiments. In some examples, the process 1700 may be carried out by the wireless apparatus 1600 illustrated in FIG. 16. In some examples, the process 1700 may be carried out by any suitable apparatus or means for carrying out the functions or algorithm described below. In some examples, the process 1700 may be carried out by any UE, D2D device, scheduled entity, or V2X device illustrated in FIGS. 1-3, 8, 9, 12-14, and 16.

At block 1702, a first apparatus can select a first periodic communication resource set (ComReSet) from a resource pool divided in a time domain into a plurality of periodic communication resource sets (ComReSets) dedicated to sidelink communication. In some aspects, the first apparatus can determine the resource pool based on a resource pool configuration as described above. The resource pool may include time-frequency resources (e.g., REs 406 or RBs 408) that are reserved or available for sidelink communication. In one example, the resource pool configuration includes a plurality of parameters. Some exemplary parameters are: a periodicity of a ComReSet, a number of ComReSets in the resource pool, and a size (e.g., number of slots) of each ComReSet. In some aspects, the sidelink resource selection circuit 1642 can provide a means for determining the resource pool.

At block 1704, the first apparatus can establish a sidelink connection with a second apparatus using the first periodic ComReSet selected from the plurality of periodic ComReSets. In some aspects, the communication and processing circuit 1640 can provide a means for establishing the sidelink connection with the second apparatus. In some aspects, the first apparatus can negotiate with the second apparatus to select one or more periodic ComReSets (e.g., first periodic ComReSet) to establish a sidelink connection with the second apparatus. In some aspects, the sidelink resource selection circuit 1642 can provide a means for selecting the first periodic ComReSet. Each periodic ComReSet can include one or more slots. In one example, the periodic ComReSets may be any of the periodic ComReSets described above in relation to FIGS. 5-7, 10, and 11.

At block 1704, the first apparatus can communicate with the second apparatus using the first ComReSet for sidelink communication. In some aspects, the communication and processing circuit 1640 can provide a means for communicating with the second apparatus using the first ComReSet via the transceiver 1610.

In one aspect, the first apparatus may negotiate with the second apparatus using communication resources that is distinct from the first resource pool. For example, the communication resources may be resources dedicated or reserved for sidelink discovery or resource negotiation. In another example, the first apparatus may negotiate with the second apparatus using a predetermined communication resource in the first resource pool dedicated for sidelink resource negotiation. In another example, the first apparatus and second apparatus can randomly scan the first resource pool until the first apparatus and the second apparatus agree on the one or more periodic communication resource sets for the sidelink communication. In another example, the first apparatus selects one or more periodic communication resource sets for the sidelink communication, and notifies the second apparatus on the selected one or more periodic communication resource sets.

Figure 18:
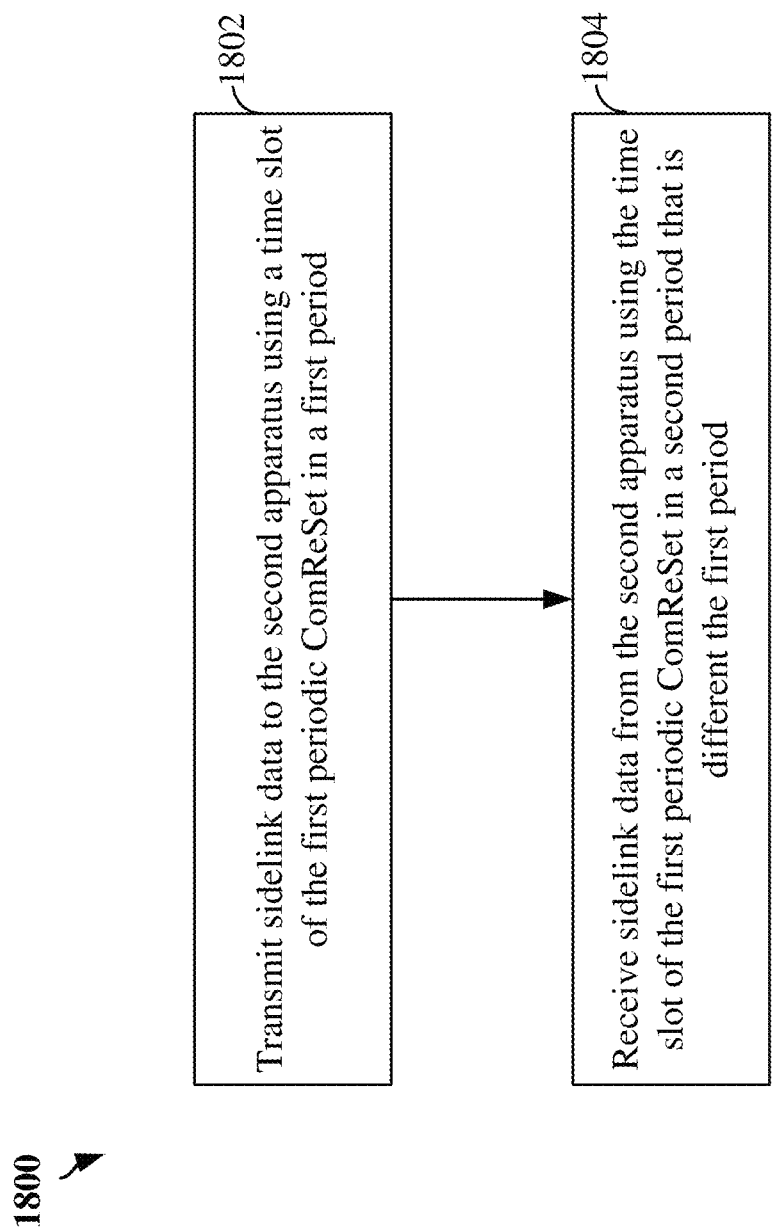
FIG. 18 a flow chart illustrating an exemplary sidelink communication process using a ComReSet including a single time slot according to some aspects of the disclosure.

FIG. 18 is a flow chart illustrating an exemplary sidelink communication process 1800 using a ComReSet including a single time slot according to some aspects of the disclosure. In some examples, the process 1800 may be carried out by the wireless apparatus 1600 illustrated in FIG. 16. In some examples, the process 1800 may be carried out by any suitable apparatus or means for carrying out the functions or algorithm described below.

In some examples, a first apparatus (e.g., UE 1) and a second apparatus (e.g., UE 2) can take turns using a first periodic ComReSet that includes a single time slot (e.g., time slot of ComReSet 702 of FIG. 7) for sidelink communication. At block 1802, the first apparatus can transmit sidelink data to the second apparatus using a time slot of the first periodic ComReSet in a first period (e.g., period 712 of FIG. 7). In one aspect, the communication and processing circuit 1640 can provide a means for transmitting sidelink data to the second apparatus. At block 1804, the first apparatus can receive sidelink data from the second apparatus using the same time slot of the first periodic ComReSet in a second period (e.g., N-th period 714 of FIG. 7) that is different from the first period. In one aspect, the communication and processing circuit 1640 can provide a means for receiving sidelink data from the second apparatus.

FIG. 19 is a flow chart illustrating an exemplary sidelink communication process 1900 using a ComReSet comprising multiple time slots according to some aspects of the disclosure. In some examples, the process 1900 may be carried out by the wireless apparatus 1600 illustrated in FIG. 16. In some examples, the process 1900 may be carried out by any suitable apparatus or means for carrying out the functions or algorithm described below.

In some examples, a first apparatus (e.g., UE 1) and a second apparatus (e.g., UE 2) can use a first periodic ComReSet (e.g., ComReSet 1002 of FIG. 10) that includes multiple time slots for sidelink communication. At block 1902, the first apparatus can transmit sidelink data to the second apparatus using a first time slot (e.g., time slot 1004 of FIG. 10) of the first periodic ComReSet in a first period (e.g., period 1020 of FIG. 10). In one aspect, the communication and processing circuit 1640 can provide a means for transmitting sidelink data to the second apparatus. At block 1904, the first apparatus can receive sidelink data from the second apparatus using a second time slot (e.g., time slot 1006 of FIG. 10) of the first periodic ComReSet in the same first period. In one aspect, the communication and processing circuit 1640 can provide a means for receiving sidelink data from the second apparatus.

Several aspects of a wireless communication network have been presented with reference to an exemplary implementation. As those skilled in the art will readily appreciate, various aspects described throughout this disclosure may be extended to other telecommunication systems, network architectures and communication standards.

In a first aspect, a method of wireless communication at a first apparatus is provided. The method includes selecting a first periodic communication resource set (ComReSet) from a resource pool divided in a time domain into a plurality of periodic communication resource sets (ComRe-Sets) dedicated to sidelink communication; establishing a sidelink connection with a second apparatus using the first periodic ComReSet selected from the plurality of periodic ComReSets; and communicating with the second apparatus using the first periodic ComReSet for sidelink communication.

In a second aspect, alone or in combination with the first aspect, the selecting the first periodic ComReSet includes: negotiating with the second apparatus to select the first periodic ComReSet using at least one of: communication resources that are dedicated to sidelink device discovery and are distinct from the resource pool; a predetermined ComReSet among the plurality of periodic ComReSets; or a predetermined communication resource in the resource pool dedicated to sidelink communication resource negotiation.

In a third aspect, alone or in combination with the second aspect, the predetermined communication resource includes a second periodic ComReSet that is different from the plurality of periodic ComReSets.

In a fourth aspect, alone or in combination with any of the first to third aspects, the selecting the first periodic ComReSet includes randomly scanning the plurality of periodic ComReSets until the first apparatus and the second apparatus agree on the first periodic ComReSet for the sidelink connection.

In a fifth aspect, alone or in combination with any of the first to third aspects, the selecting the first periodic ComReSet includes selecting, by the first apparatus alone, the first periodic ComReSet for the sidelink connection; and notifying the second apparatus on the selected first periodic ComReSet.

In a sixth aspect, alone or in combination with any of the first to third aspects, the selecting the first periodic ComReSet includes receiving a notification from the second apparatus on the first periodic ComReSet that is selected by the second apparatus alone.

In a seventh aspect, alone or in combination with any of the first to sixth aspects, the communicating with the second apparatus includes: taking turns with the second apparatus to use a first time slot of the first periodic ComReSet for sidelink communication, including: transmitting sidelink data to the second apparatus using the first time slot of the first periodic ComReSet in a first period; and receiving sidelink data from the second apparatus using the first time slot of the first periodic ComReSet in a second period that is different from the first period.

In an eighth aspect, alone or in combination with any of the first to sixth aspects, the first periodic ComReSet includes a plurality of time slots, and the communicating with the second apparatus includes: transmitting sidelink data to the second apparatus in a first time slot of the first periodic ComReSet in a first period; and receiving sidelink data from the second apparatus in a second time slot of the first periodic ComReSet in the first period.

In a ninth aspect, alone or in combination with any of the first to eighth aspects, the plurality of periodic ComReSets further comprise a second periodic ComReSet, and the first periodic ComReSet and the second periodic ComReSet are different in at least one of periodicity or time duration.

In a tenth aspect, alone or in combination with any of the first to ninth aspects, the selecting the first periodic ComReSet includes identifying the plurality of periodic ComReSets according to a resource pool configuration that comprises a plurality of parameters including a periodicity parameter for each ComReSet, a ComReSet quantity parameter, and a size parameter for each ComReSet.

In an eleventh aspect, alone or in combination with any of the first to tenth aspects, the method further includes at least one of: adding a periodic ComReSet to the sidelink connection in response to a triggering event; releasing a periodic ComReSet from the sidelink connection in response to a triggering event; or merging two or more ComReSets of the plurality of periodic ComReSets into a merged ComReSet.

In a twelfth aspect, alone or in combination with any of the first to eleventh aspects, the communicating with the second apparatus includes transmitting or receiving a sidelink control channel and a sidelink data channel in a same period of the first periodic ComReSet.

In a thirteenth aspect, alone or in combination with any of the first to twelfth aspects, the communicating with the second apparatus includes: transmitting or receiving a sidelink control channel in the first periodic ComReSet; and transmitting or receiving a sidelink data channel corresponding to the sidelink control channel in a second periodic ComReSet of the plurality of periodic ComReSets.

In a fourteenth aspect, alone or in combination with any of the first to thirteenth aspects, the communicating with the second apparatus includes: transmitting sidelink data in the first periodic ComReSet; and receiving feedback information of the sidelink data in the first periodic ComReSet or a second periodic ComReSet of the plurality of periodic ComReSets.

In a fifteen aspect, a first apparatus for wireless communication is provided. The first apparatus includes a transceiver configured to communicate with a second apparatus, a memory, and a processor operatively coupled to the memory and the transceiver. The processor and the memory are configured to: select a first periodic communication resource set (ComReSets) from a resource pool divided in a time domain into a plurality of periodic communication resource sets (ComReSets) dedicated to sidelink communication; establish a sidelink connection with a second apparatus using the first periodic ComReSet selected from the plurality of periodic ComReSets; and communicate with the second apparatus using the first periodic ComReSet for sidelink communication.

In a sixteenth aspect, alone or in combination with the fifteenth aspect, the processor and the memory are further configured to: negotiate with the second apparatus to select the first periodic ComReSet using at least one of: communication resources that are dedicated to sidelink device discovery and are distinct from the resource pool; a predetermined ComReSet among the plurality of periodic ComReSets; or a predetermined communication resource in the resource pool dedicated to sidelink communication resource negotiation.

In a seventeenth aspect, alone or in combination with the sixteenth aspect, the predetermined communication resource includes a second periodic ComReSet that is different from the plurality of periodic ComReSets.

In an eighteenth aspect, alone or in combination with any of the fifteenth to seventeenth aspects, for selecting the first periodic ComReSet, the processor and the memory are further configured to randomly scan the plurality of periodic ComReSets until the first apparatus and the second apparatus agree on the first periodic ComReSet for the sidelink connection.

In a nineteenth aspect, alone or in combination with any of the fifteenth to seventeenth aspects, for selecting the first periodic ComReSet, the processor and the memory are further configured to: select, by the first apparatus alone, the first periodic ComReSet for the sidelink connection; and notify the second apparatus on the selected first periodic ComReSet.

In a twentieth aspect, alone or in combination with any of the fifteenth to seventeenth aspects, for selecting the first periodic ComReSet, the processor and the memory are further configured to receive a notification from the second apparatus on the first periodic ComReSet that is selected by the second apparatus alone.

In a twenty-first aspect, alone or in combination with any of the fifteenth to twentieth aspects, for communicating with the second apparatus, the processor and the memory are further configured to: take turns with the second apparatus to use a first time slot of the first periodic ComReSet for sidelink communication, including: transmitting sidelink data to the second apparatus using the first time slot of the first periodic ComReSet in a first period; and receiving sidelink data from the second apparatus using the first time slot of the first periodic ComReSet in a second period that is different from the first period.

In a twenty-second aspect, alone or in combination with any of the fifteenth to twenty-first aspects, wherein the first periodic ComReSet includes a plurality of time slots, and the processor and the memory are further configured to: transmit sidelink data to the second apparatus in a first time slot of the first periodic ComReSet in a first period; and receive sidelink data from the second apparatus in a second time slot of the first periodic ComReSet in the first period.

In a twenty-third aspect, alone or in combination with any of the fifteenth to twenty-second aspects, wherein the plurality of periodic ComReSets further include a second periodic ComReSet, and the first periodic ComReSet and the second periodic ComReSet are different in at least one of periodicity or time duration.

In a twenty-fourth aspect, alone or in combination with any of the fifteenth to twenty-third aspects, the processor and the memory are further configured to: identify the plurality of periodic ComReSets according to a resource pool configuration that includes a plurality of parameters including a periodicity parameter for each ComReSet, a ComReSet quantity parameter, and a size parameter for each ComReSet.

In a twenty-fifth aspect, alone or in combination with any of the fifteenth to twenty-fourth aspects, the processor and the memory are further configured to, at least one of: add a periodic ComReSet to the sidelink connection in response to a triggering event; release a periodic ComReSet from the sidelink connection in response to a triggering event; or merge two or more ComReSets of the plurality of periodic ComReSets into a merged ComReSet.

In a twenty-sixth aspect, alone or in combination with any of the fifteenth to twenty-fifth aspects, the processor and the memory are further configured to transmit or receive a sidelink control channel and a sidelink data channel in a same period of the first periodic ComReSet.

In a twenty-seventh aspect, alone or in combination with any of the fifteenth to twenty-fifth aspects, the processor and the memory are further configured to: transmit or receive a sidelink control channel in the first periodic ComReSet; and transmit or receive a sidelink data channel corresponding to the sidelink control channel in a second periodic ComReSet of the plurality of periodic ComReSets.

In a twenty-eighth aspect, alone or in combination with any of the fifteenth to twenty-fifth aspects, wherein the processor and the memory are further configured to: transmit sidelink data in the first periodic ComReSet; and receive feedback information of the sidelink data in the first periodic ComReSet or a second periodic ComReSet of the plurality of periodic ComReSets.

In a twenty-ninth aspect, alone or in combination with any of the fifteenth to twenty-eighth aspects, the processor and the memory are further configured to enter a power saving mode or stop sidelink activity during one or more time slots of the resource pool that is not included in the plurality of periodic ComReSets.

In a thirtieth aspect, an article of manufacture is used by a first apparatus in a wireless communication network. The article includes: a computer-readable medium having stored therein instructions executable by a processor of the first apparatus to: select a first periodic communication resource set (ComReSets) from a resource pool divided in a time domain into a plurality of periodic communication resource sets (ComReSets) dedicated to sidelink communication; establish a sidelink connection with a second apparatus using the first periodic ComReSet selected from the plurality of periodic ComReSets; and communicate with the second apparatus using the first periodic ComReSet for sidelink communication.

In a thirty-first aspect, the article causes the first apparatus to perform any combination of the methods described in any of the first to fifteenth aspects.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-19 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(1) unless the element is expressly recited using the phrase "means for" or, in the case of a method claim, the element is recited using the phrase "step for."

What is claimed is:

1. A method of wireless communication at a first apparatus, comprising:
    identifying a plurality of periodic communication resource sets (ComReSets) dedicated to sidelink communication, each of the periodic ComReSets occurring periodically in time, according to a resource pool configuration that comprises a plurality of parameters including a periodicity parameter for each ComReSet, a ComReSet quantity parameter, and a size parameter for each ComReSet;
    selecting a first periodic ComReSet from the plurality of periodic ComReSets;
    establishing a sidelink connection with a second apparatus using the first periodic ComReSet selected from the plurality of periodic ComReSets; and
    communicating with the second apparatus using the first periodic ComReSet for sidelink communication,
    wherein the selecting the first periodic ComReSet comprises scanning the plurality of periodic ComReSets until the first apparatus and the second apparatus agree on the first periodic ComReSet for the sidelink connection.

2. The method of claim 1, wherein the selecting the first periodic ComReSet comprises:
negotiating with the second apparatus to select the first periodic ComReSet using at least one of:
communication resources that are dedicated to sidelink device discovery and are distinct from the resource pool;
a predetermined ComReSet among the plurality of periodic ComReSets; or
a predetermined communication resource in the resource pool dedicated to sidelink communication resource negotiation.

3. The method of claim 2, wherein the predetermined communication resource comprises a second periodic ComReSet that is different from the plurality of periodic ComReSets.

4. The method of claim 1, wherein the selecting the first periodic ComReSet comprises:
randomly scanning the plurality of periodic ComReSets until the first apparatus and the second apparatus agree on the first periodic ComReSet for the sidelink connection.

5. The method of claim 1, wherein the communicating with the second apparatus comprises:
taking turns with the second apparatus to use a first time slot of the first periodic ComReSet for sidelink communication, comprising:
transmitting sidelink data to the second apparatus using the first time slot of the first periodic ComReSet in a first period; and
receiving sidelink data from the second apparatus using the first time slot of the first periodic ComReSet in a second period that is different from the first period.

6. The method of claim 1, wherein:
the first periodic ComReSet comprises a plurality of time slots, and the communicating with the second apparatus comprises:
transmitting sidelink data to the second apparatus in a first time slot of the first periodic ComReSet in a first period; and
receiving sidelink data from the second apparatus in a second time slot of the first periodic ComReSet in the first period.

7. The method of claim 1, wherein the plurality of periodic ComReSets further comprise a second periodic ComReSet, and the first periodic ComReSet and the second periodic ComReSet are different in at least one of periodicity or time duration.

8. The method of claim 1, further comprising at least one of:
adding a periodic ComReSet to the sidelink connection in response to a triggering event;
releasing a periodic ComReSet from the sidelink connection in response to a triggering event; or
merging two or more ComReSets of the plurality of periodic ComReSets into a merged ComReSet.

9. The method of claim 1, wherein the communicating with the second apparatus comprises:
transmitting or receiving a sidelink control channel and a sidelink data channel in a same period of the first periodic ComReSet.

10. The method of claim 1, wherein the communicating with the second apparatus comprises:
transmitting or receiving a sidelink control channel in the first periodic ComReSet; and
transmitting or receiving a sidelink data channel corresponding to the sidelink control channel in a second periodic ComReSet of the plurality of periodic ComReSets.

11. The method of claim 1, wherein the communicating with the second apparatus comprises:
transmitting sidelink data in the first periodic ComReSet; and
receiving feedback information of the sidelink data in the first periodic ComReSet or a second periodic ComReSet of the plurality of periodic ComReSets.

12. A first apparatus for wireless communication comprising:
one or more memories; and
one or more processors coupled to the memories,
wherein the one or more processors configured to:
identify a plurality of periodic communication resource sets (ComReSets) dedicated to sidelink communication, each of the periodic ComReSets occurring periodically in time, according to a resource pool configuration that comprises a plurality of parameters including a periodicity parameter for each ComReSet, a ComReSet quantity parameter, and a size parameter for each ComReSet;
select a first periodic ComReSet from the plurality of periodic ComReSets, wherein the selection of the first periodic ComReSet is based, at least in part, on a scan of the plurality of periodic ComReSets to identify the first periodic ComReSet for a sidelink connection as being agreed upon by the first apparatus and the second apparatus;
establish the sidelink connection with the second apparatus using the first periodic ComReSet selected from the plurality of periodic ComReSets; and
communicate with the second apparatus using the first periodic ComReSet for sidelink communication.

13. The first apparatus of claim 12, wherein the one or more processors are further configured to:
negotiate with the second apparatus to select the first periodic ComReSet using at least one of:
communication resources that are dedicated to sidelink device discovery and are distinct from the resource pool;
a predetermined ComReSet among the plurality of periodic ComReSets; or
a predetermined communication resource in the resource pool dedicated to sidelink communication resource negotiation.

14. The first apparatus of claim 13, wherein the predetermined communication resource comprises a second periodic ComReSet that is different from the plurality of periodic ComReSets.

15. The first apparatus of claim 12, wherein the scan of the plurality of periodic ComReSets comprises a random scan of the plurality of periodic ComReSets.

16. The first apparatus of claim 12, the one or more processors are further configured to:
take turns with the second apparatus to use a first time slot of the first periodic ComReSet for sidelink communication to:
transmit sidelink data to the second apparatus using the first time slot of the first periodic ComReSet in a first period; and
receive sidelink data from the second apparatus using the first time slot of the first periodic ComReSet in a second period that is different from the first period.

17. The first apparatus of claim 12,
wherein the first periodic ComReSet comprises a plurality of time slots, and
wherein the one or more processors are further configured to:
  transmit sidelink data to the second apparatus in a first time slot of the first periodic ComReSet in a first period; and
  receive sidelink data from the second apparatus in a second time slot of the first periodic ComReSet in the first period.

18. The first apparatus of claim 12, wherein the plurality of periodic ComReSets further comprise a second periodic ComReSet, and the first periodic ComReSet and the second periodic ComReSet are different in at least one of periodicity or time duration.

19. The first apparatus of claim 12, wherein the one or more processors are further configured to, at least one of:
  add a periodic ComReSet to the sidelink connection in response to a triggering event;
  release a periodic ComReSet from the sidelink connection in response to a triggering event; or
  merge two or more ComReSets of the plurality of periodic ComReSets into a merged ComReSet.

20. The first apparatus of claim 12, wherein the one or more processors are further configured to:
  transmit or receive a sidelink control channel and a sidelink data channel in a same period of the first periodic ComReSet.

21. The first apparatus of claim 12, wherein the one or more processors are further configured to:
  transmit or receive a sidelink control channel in the first periodic ComReSet; and
  transmit or receive a sidelink data channel corresponding to the sidelink control channel in a second periodic ComReSet of the plurality of periodic ComReSets.

22. The first apparatus of claim 12, wherein the one or more processors are further configured to:
  transmit sidelink data in the first periodic ComReSet; and
  receive feedback information of the sidelink data in the first periodic ComReSet or a second periodic ComReSet of the plurality of periodic ComReSets.

23. The first apparatus of claim 12, wherein the one or more processors are further configured to:
  enter a power saving mode or stop sidelink activity during one or more time slots of the resource pool that is not included in the plurality of periodic ComReSets.

24. An article of manufacture for use by a first apparatus in a wireless communication network, the article comprising:
  a non-transitory computer-readable medium having stored therein instructions executable by a processor of the first apparatus to:
  identify a plurality of periodic communication resource sets (ComReSets) dedicated to sidelink communication, each of the periodic ComReSets occurring periodically in time, according to a resource pool configuration that comprises a plurality of parameters including a periodicity parameter for each ComReSet, a ComReSet quantity parameter, and a size parameter for each ComReSet;
  select a first periodic ComReSet from the plurality of periodic ComReSets, wherein the selection of the first periodic ComReSet is based, at least in part, on a scan of the plurality of periodic ComReSets to identify the first periodic ComReSet for a sidelink connection as being agreed upon by the first apparatus and a second apparatus;
  establish the sidelink connection with the second apparatus using the first periodic ComReSet selected from the plurality of periodic ComReSets; and
  communicate with the second apparatus using the first periodic ComReSet for sidelink communication.

* * * * *